United States Patent
Vaddadi et al.

(10) Patent No.: US 9,036,925 B2
(45) Date of Patent: May 19, 2015

(54) ROBUST FEATURE MATCHING FOR VISUAL SEARCH

(75) Inventors: Sundeep Vaddadi, San Diego, CA (US); Onur C. Hamsici, La Jolla, CA (US); Yuriy Reznik, Seattle, WA (US); John H. Hong, San Clemente, CA (US); Chong U. Lee, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 564 days.

(21) Appl. No.: 13/312,335

(22) Filed: Dec. 6, 2011

(65) Prior Publication Data

US 2012/0263388 A1 Oct. 18, 2012

Related U.S. Application Data

(60) Provisional application No. 61/475,428, filed on Apr. 14, 2011.

(51) Int. Cl.
*G06K 9/62* (2006.01)
*G06K 9/54* (2006.01)
*G06K 9/60* (2006.01)
*G06F 17/30* (2006.01)

(52) U.S. Cl.
CPC .......... *G06F 17/30247* (2013.01); *G06K 9/627* (2013.01); *G06K 9/62* (2013.01)

(58) Field of Classification Search
USPC ............ 382/225, 305; 707/E17.019–E17.031
See application file for complete search history.

(56) References Cited

U.S. PATENT DOCUMENTS

| 5,819,258 A | 10/1998 | Vaithyanathan et al. |
| 6,134,541 A | 10/2000 | Castelli et al. |
| 6,347,313 B1 | 2/2002 | Ma et al. |
| 6,400,996 B1 | 6/2002 | Hoffberg et al. |

(Continued)

FOREIGN PATENT DOCUMENTS

| EP | 1383072 A1 | 1/2004 |
| EP | 2015227 A2 | 1/2009 |

(Continued)

OTHER PUBLICATIONS

Vaddadi et al., "Keypoint Clustering for Robust Image Matching", Proc. SPIE 7798, Applications of Digital Image Processing XXXIII, 77980K (Sep. 7, 2010); doi:10.1117/12.862359.*

(Continued)

*Primary Examiner* — Aaron W Carter
(74) *Attorney, Agent, or Firm* — Kilpatrick Townsend & Stockton LLP

(57) ABSTRACT

Techniques are disclosed for performing robust feature matching for visual search. An apparatus comprising an interface and a feature matching unit may implement these techniques. The interface receives a query feature descriptor. The feature matching unit then computes a distance between a query feature descriptor and reference feature descriptors and determines a first group of the computed distances and a second group of the computed distances in accordance with a clustering algorithm, where this second group of computed distances comprises two or more of the computed distances. The feature matching unit then determines whether the query feature descriptor matches one of the reference feature descriptors associated with a smallest one of the computed distances based on the determined first group and second group of the computed distances.

37 Claims, 8 Drawing Sheets

(56) References Cited

U.S. PATENT DOCUMENTS

| | | | |
|---|---|---|---|
| 6,446,068 B1 | 9/2002 | Kortge | |
| 6,711,293 B1 | 3/2004 | Lowe | |
| 7,006,714 B2 | 2/2006 | Kasutani | |
| 7,216,129 B2 | 5/2007 | Aono et al. | |
| 7,263,205 B2 | 8/2007 | Lev | |
| 7,447,362 B2 | 11/2008 | Lev | |
| 7,508,954 B2 | 3/2009 | Lev | |
| 7,539,657 B1 | 5/2009 | Liu et al. | |
| 7,551,782 B2 | 6/2009 | Haim Lev | |
| 7,561,723 B2* | 7/2009 | Goldberg et al. | 382/115 |
| 7,575,171 B2 | 8/2009 | Lev | |
| 7,672,939 B2 | 3/2010 | Burges | |
| 7,725,484 B2 | 5/2010 | Nister et al. | |
| 7,860,317 B2 | 12/2010 | Xie et al. | |
| 7,903,883 B2 | 3/2011 | Zitnick, III | |
| 7,921,169 B2 | 4/2011 | Jacobs et al. | |
| 8,276,088 B2 | 9/2012 | Ke et al. | |
| 8,548,255 B2* | 10/2013 | Gao et al. | 382/218 |
| 8,605,956 B2* | 12/2013 | Ross et al. | 382/118 |
| 2002/0019819 A1 | 2/2002 | Sekiguchi et al. | |
| 2003/0020743 A1* | 1/2003 | Barbieri | 345/719 |
| 2005/0259884 A1 | 11/2005 | Murakami et al. | |
| 2005/0285764 A1 | 12/2005 | Bessette et al. | |
| 2006/0055569 A1 | 3/2006 | Tomic | |
| 2007/0198568 A1 | 8/2007 | Luo et al. | |
| 2007/0242900 A1 | 10/2007 | Chen et al. | |
| 2008/0034396 A1 | 2/2008 | Lev | |
| 2008/0177764 A1 | 7/2008 | Kise et al. | |
| 2009/0017765 A1 | 1/2009 | Lev | |
| 2009/0132487 A1 | 5/2009 | Lev | |
| 2009/0147990 A1 | 6/2009 | Lev | |
| 2009/0282025 A1 | 11/2009 | Winter et al. | |
| 2010/0070989 A1 | 3/2010 | Lev | |
| 2010/0131714 A1 | 5/2010 | Chandrasekaran | |
| 2010/0149322 A1 | 6/2010 | Lev | |
| 2010/0166339 A1 | 7/2010 | Gokturk et al. | |
| 2010/0268733 A1 | 10/2010 | Hayaishi et al. | |
| 2011/0314031 A1 | 12/2011 | Chittar et al. | |
| 2012/0027290 A1 | 2/2012 | Bahet et al. | |
| 2012/0110025 A1 | 5/2012 | Reznik | |
| 2012/0117122 A1 | 5/2012 | Wang et al. | |
| 2012/0330967 A1 | 12/2012 | Vaddadi et al. | |
| 2013/0044944 A1* | 2/2013 | Wang et al. | 382/165 |
| 2013/0132377 A1* | 5/2013 | Lin et al. | 707/723 |

FOREIGN PATENT DOCUMENTS

| | | | |
|---|---|---|---|
| EP | 2284791 A1 | 2/2011 | |
| JP | 2001005967 A | 1/2001 | |
| JP | 2002007432 A | 1/2002 | |
| JP | 2004508756 A | 3/2004 | |
| JP | 2010061285 A | 3/2010 | |
| JP | 2010518507 A | 5/2010 | |
| JP | 2011008507 A | 1/2011 | |
| KR | 20020081189 A | 10/2002 | |
| KR | 20080111574 A | 12/2008 | |
| WO | WO0034893 A1 | 6/2000 | |
| WO | WO0221529 A1 | 3/2002 | |
| WO | WO2008045521 A2 | 4/2008 | |
| WO | WO-2008100248 A2 | 8/2008 | |
| WO | WO-2010101186 A1 | 9/2010 | |
| WO | WO2010141474 A1 | 12/2010 | |
| WO | WO2010141926 A1 | 12/2010 | |
| WO | WO-2013071981 A1 | 5/2013 | |

OTHER PUBLICATIONS

Response to Written Opinion dated Oct. 30, 2012 for corresponding PCT Application No. PCT/US2011/057675 (42 pgs).
International Search Report and Written Opinion—PCT/US2012/033620—ISA/EPO—Jul. 5, 2012.
International Search Report and Written Opinion—PCT/US2012/041324—ISA/EPO—Sep. 4, 2012.
Sumakwel Muralla, "A Method of accelerating K-means by directed perturbation of the codevectors", dated Jun. 25, 2006, pp. 15, 17-19 and 49.
Alexandrina Rogozan : "UV Theorie de l'Information", May 25, 2008, pp. 1-12, XP55026473, Retrieved from the Internet: URL:http://asi.insa-rouen.fr/enseignement/_siteUV/ti/private/Cours5TI.pdf [retrieved on May 8, 2012].
Ananth Grama: "Trees", Data structures course slides, Jan. 3, 2001, pp. 1-18, XP55026471, http://www.cs.purdue.edu/homes/ayg/CS251/slides/ Retrieved from the Internet: URL:http://www.cs.purdue.edu/homes/ayg/CS251/slides/chap5.pdf [retrieved on May 8, 2012].
Guy Louchard et al: "Average Profile of Generalized Digital Search Trees and the Generalized Lempel -Ziv Algorithm" , Jan. 1, 1996, XP55026426, Retrieved from the Internet: URL:http://docs.lib.purdue.edu/cgi/viewcontent.cgi?article=2260&context=cstech [retrieved on May 8, 2012] p. 2-p. 4.
Vijay Chandrasekhar et al: "Comparison of local feature descriptors for mobile visual search", 2010 17th IEEE International Conference on Image Processing : (ICIP 2010) ; Hong Kong, Sep. 26-28, 2010, IEEE, Piscataway, NJ, USA, Sep. 26, 2010, pp. 3885-3888, XP031811617, ISBN: 978-1-4244-7992-4.
Bouteldja N., et al., "HiPeR: Hierarchical progressive exact retrieval in multi dimensional spaces," Proceedings of the 2008 IEEE 24th International Conference on Data Engineering Workshop, Apr. 7-12, 2008, pp. 320-329.
Bouteldja N., et al., "The many Facets of progressive retrieval for CBIR," Advances in multimedia Information processing—PCM 2008, Lecture Notes in Computer Sciences 5353, Dec. 9, 2008, pp. 611-624.
Chandrasekhar V., et al., "Compressed Histogram of Gradients: A Low-Bitrate Descriptor," Int J Comput Vis, vol. 96 (3), 2011, pp. 384-399, XP035008617, DOI 10.1007/s11263-011-0453-z.
Chandrasekhar V., et al., "Low latency image retrieval with progressive transmission of ChoG descriptors," Proceedings of the 2010 ACM Multimedia Workshop on Mobile Cloud Media Computing, Oct. 29, 2010, pp. 41-46.
Iwamoto K., et al., "NEC's Response to the CfP for Compact Descriptor for Visual Search," MPEG Input Document M22717, 98th MPEG Meeting, Geneva, CH, Nov. 2011, 10 Pages.
Zhu Li, et al., "CDVS CD 6: Incremental query processing with a holistic feature feedbacks," Document M27108, MPEG Meeting Shanghai CN, Oct. 2012, 5 Pages.
Reznik Y.A., et al., "On MPEG work towards a standard for visual search," proceedings of SPIE, Aug. 2011, pp. 813516-1 to 813516-7, vol. 8135.
Tzou K.H., "Progressive image transmission: A review and comparison of techniques," Optical Engineering, Jul. 1987, pp. 581-589, vol. 26 (7).
Xia J., et al., "Geometric context-preserving progressive transmission in mobile visual search," Proceedings of the 20th ACM International Conference on Multimedia, Nara, Japan, Oct. 29-Nov. 2, 2012, pp. 953-956.
J.S. Beis and D.G. Lowe. Shape indexing using approximate nearest-neighbour search in high-dimensional spaces. In cvpr, p. 1000. Published by the IEEE Computer Society, 1997.
Mikolajczyk, K et al., "Improving Descriptors for Fast Tree Matching by Optimal Linear Projection", IEEE 11th International Conference on Digital Object Identifier: 10.1109/ICCV.2007.4408871, Computer Vision, 2007. ICCV 2007, 8 pages.
ER M. C., "Lexicographic Listing and Ranking of t-ary Trees", Computer Journal, Dec. 1, 1987, pp. 569-572, vol. 30, No. 6, Oxford University Press, XP000743650, ISSN: 0010-4620, DOI: 10. 1093/COMJNL/30.3.282.
Andersson, S., "Improved behaviour of tries by adaptive branching," Information Processing Letters, vol. 46, No. 6, pp. 295-300, Jul. 1993.
Bay H et al., "SURF: Speeded Up Robust Features, Computer Vision and Image Understanding", vol. 110, No. 3, pp. 346-359, 2008.
Chandrasekhar et al., "CHoG: Compressed Histogram of Gradients, A Low Bit-Rate Feature Descriptor," found at www.stanford.edu/-bgirod/pdfs/Chandrasekhar_CVPR2009.pdf, on Jan. 19, 2011, 8 pp.

(56) References Cited

OTHER PUBLICATIONS

Chandrasekhar et al., "Quantization Schemes for Low Bitrate Compressed Histogram of Gradients Descriptors," found at http://research.nokia.com/files/public/chandrasekhar_quantization_cvpr10_icmw.pdf.on Jan. 10, 2011, 8 PP.

Chandrasekhar et al., "Survey of SIFT Compression Schemes," found at http://www.stanford.edu/-mamakar/pub_files/VijayICPR-WMMP2010.pdf, on Jan. 20, 2011, 8 pp.

Coffman E. G et al., "File Structures Using Hashing Functions", Communications of the ACM, vol. 13, No. 7, pp. 427-436, 1970.

Cover T. et al., "Data-Processing Inequality" Chapter 2.8 of Elements of Information Theory, p. 34, 1991.

D G Lowe, "Distinctive image features from scale-invariant key points," International Journal of computer vision, vol. 60, pp. 91-110, 2004.

David M. Chen et al., "Tree Histogram Coding for Mobile Image Matching" Data Compression Conference, 2009. DCC '09, IEEE, Piscataway, NJ, USA, Mar. 16, 2009, pp. 143-152, XP031461096.

Drmota M et al., "Tunstall Code, Khodak Variations, and Random Walks", IEEE Trans. Inform. Theory, vol. 56, No. 6, pp. 2928-2937, Jun. 2010.

Flajolet P et al., "Digital Search Trees Revisited", SIAM J. Computing, vol. 15, pp. 748-767, 1986.

Fukunaga, "Introduction to Statistical Pattern Recognition Second Edition," Academica Press, Prof., Inc., San Diego, CA, 1990.

Gagie T, "Compressing Probability Distributions", Information Processing Letters, vol. 97, No. 4, pp. 133-137, 2006.

Girod B. et al., "Mobile Visual Search", Proceedings of Special Issue: Mobile Media Search, IEEE Signal Processing Magazine, 2011.

H. Bay, T. Tuytelaars, and L.Van Gool. Surf Speeded-up robust features, in 9th European Conference on Computer vision, pp. 405-417, 2006.

J. Ziv and A. Lempel, "Compression of Individual Sequences via Variable-rate Coding", IEEE Transactions on Information Theory, vol. IT-24, No. 5, pp. 530-536, Sep. 1978.

Katajainen J et al., "Tree Compression and Optimization With Applications", International Journal of Foundations of Computer Science, vol. 1, No. 4, 1990, pp. 425-447.

Khodak G. L, "Redundancy Estimates for Word-Based Encoding of Messages Produced by Bernoulli Sources", Probl. Inform. Trans., 8, (2) (1972) 21-32 (in Russian).

Kirschenhofer P. et al., "Some Further Results on Digital Search Trees", Lecture Notes in Computer Science, vol. 229, pp. 177-185, Springer-Verlag, New York, 1986.

Knuth, D. E., "The Art of Computer Programming. Sorting and Searching," vol. 3, Addison-Wesley, Reading, MA, 1973.

Krichevsky, "Universal Data Compression and Retrieval." (Kluwer, Norwell, MA, 1993).

Krystian Mikolajczyk and Cordelia Schmid. "A Performance Evaluation of Local Descriptors," IEEE Transactions on Pattern Analysis and Machine Intelligence, vol. 27, No. 10, Oct. 2005, pp. 1615-1630.

Lewis D et al., "Naive (Bayes) at Forty: The Independence Assumtion in Information Retrieval", Proc. 10th European Conference on Machine Learning (ECML-98), 1998, pp. 4-15.

Louchard G et al, "On the Average Redundancy Rate of the Lempel-Ziv Code", IEEE Trans. Information Theory, vol. 43, No. 1, pp. 2-8, Jan. 1997.

Makinen E, "A Survey of Binary Tree Codings", The Computer Journal, vol. 34, No. 5, 1991, pp. 438-443.

Nister et al., "Scalable Recognition with a Vocabulary Tree," 2006 IEEE Computer Society Conference on Computer Vision and Pattern Recognition, 8 pp.

Raphael, et al., "A Hands-On Tour : Google Goggles Visual Search, Google Goggles Visual Search," Dec. 7, 2009, http://www.pcworld.com/printable/article/id,183933/printable.html, 4 pp.

Reznik et al., "Fast Quantization and Matching of Histogram-Based Image Features," found at http://www.reznik.org/ papers/SPIE10_chog_quantization_matching.pdf, on Sep. 3, 2010, 14 pp.

Reznik, "Quantization of Discrete Probability Distributions," WITMSE 2010, Aug. 16-18, 2010, Tampere, Finland, 6 PP.

Reznik Y. A., et al., "On the Average Redundancy Rate of the Lempel-Ziv Code with the K-Error Protocol", Information Sciences, vol. 135, pp. 57-70, 2001.

Reznik Y. A., "Some Results on Tries with Adaptive Branching", Theoretical Computer Science, vol. 289, No. 2, pp. 1009-1026, 2002.

Shi, et al., "Normalized Cuts and Image Segmentation," IEEE Transactions on Pattern Analysis and Machine Intelligence, vol. 22, No. 8, pp. 888-905, Aug. 2000.

Szpankowski W, "A Characterization of Digital Search Trees From The Successful Search Viewpoint", Theoretical Computer Science, vol. 85, pp. 117-134, 199.

Takacs G, et al., "Outdoors augmented reality on mobile phone using loxel-based visual feature organization", Proceedings of the 2008 ACM International Conference on Multimedia With Co-Located Symposium & Workshops, Vancouver, BC, Canada, Oct. 27, 2008, pp. 427-434, XP007915264, DOI: 10.1145/1460096.1460165 ISBN: 978-1-60558-312-9, In particular, Sections 1, 2, 3, and 5.

Tsai, et al., "Fast Geometric Re-Ranking for Image-Based Retrieval," 17th IEEE International Conference on Image Processing, Hong Kong, pp. 1029-1032, Sep. 26-29, 2010.

Tunstall B. P., "Synthesis of Noiseless Compression Codes", Ph.D. dissertation, Georgia Inst. Tech., Atlanta, GA, 1967.

U.S. Appl. No. 13/158,013, by Yuriy Reznik, filed Jun. 10, 2011.

U.S. Appl. No. 12/790,265, filed May 28, 2010, entitled "Efficient Coding of Probability Distributions for Image Feature Descriptors," Reznik.

U.S. Appl. No. 12/794,271, filed Jun. 4, 2010, entitled "Efficient Incremental Coding of Probability Distributors for Image Feature Descriptors," Reznik.

Vijay Chandrasekhar., et al., "Quantization schemes for low bitrate Compressed Histogram of Gradients descriptors", Computer Vision and Pattern Recognition Workshops (CVPRW), 2010 IEEE Computer Society Conference on, IEEE, Piscataway, NJ, USA, Jun. 13, 2010, pp. 33-40, XP031728429, ISBN: 978-10-4244-7029-7.

Willems F et al, "The Context-Tree Weighting Method: Basic Properties", IEEE Trans. Inform. Theory, vol. 41, No. 3, pp. 653-664, May 1995.

Zaks S, "Lexicographic Generation of Ordered Trees", Theoretical Computer Science, vol. 10, 1980, pp. 63-82.

Zheng et al., "Fast Progressive Image Retrieval Schemes Based on Updating Enhanced Equal-average Equalvariance K-Nearest Neighbour Search in Vector Quantised Feature Database," ICICS 2007, date of current version: Feb. 12, 2008, 5 pp.

Kise K., et al., "Robust and Efficient Recognition of Low Quality Images by Increasing Reference Feature Vectors", Transactions of the Institute of Electronics, Information and Communication Engineers (IEICE), Japan, IEICE, Aug. 1, 2010, vol. J93-D, No. 8, pp. 1353-1363.

Suzuki Y., "Image detection using Sift characteristics matching: Invoking algorithm to detect characteristics points on FPGA", Interface, Japan, CQ Publishing Co., Ltd., Dec. 1, 2010, vol. 36, No. 12, pp. 142-151.

Yanai K., "Category Recognition by Bag-of-Features", Image Laboratory, Japan, Japan Industrial Publishing Co., Ltd., Jan. 10, 2009, vol. 20, No. 1, pp. 59-64 [No English version available].

* cited by examiner

ROBUST FEATURE MATCHING FOR VISUAL SEARCH

CROSS-REFERENCES TO RELATED APPLICATIONS

This application claims priority under 35 U.S.C. 119 to U.S. Provisional Patent Application Ser. No. 61/475,428, filed Apr. 14, 2011, which is hereby incorporated by reference in its entirety.

BACKGROUND

This disclosure relates to image processing systems and, more particularly, performing visual searches with image processing systems.

Visual search in the context of computing devices or computers refers to techniques that enable a computer or other device to perform a search for objects and/or features among other objects and/or features within one or more images. Recent interest in visual search has resulted in algorithms that enable computers to identify partially occluded objects and/or features in a wide variety of changing image conditions, including changes in image scale, noise, illumination, and local geometric distortion. During this same time, mobile devices have emerged that feature cameras, but which may have limited user interfaces for entering text or otherwise interfacing with the mobile device. Developers of mobile devices and mobile device applications have sought to utilize the camera of the mobile device to enhance user interactions with the mobile device.

To illustrate one enhancement, a user of a mobile device may utilize a camera of the mobile device to capture an image of any given product while shopping at a store. The mobile device may then initiate a visual search algorithm within a set of archived feature descriptors for various reference images to identify the product shown in the image (which may be referred to as a "search image") based on matching reference imagery. After identifying the product, the mobile device may then initiate a search of the Internet and present a webpage containing information about the identified product, including a lowest cost for which the product is available from nearby merchants and/or online merchants. In this manner, the user may avoid having to interface with the mobile device via keyboard (which is often a "virtual" keyboard in the sense that it is presented on a touch screen as an image with which the user interfaces) or other input mechanism but may merely capture a search image to initiate the visual search and subsequent web searches.

While there are a number of applications that a mobile device equipped with a camera and access to visual search may employ, visual search algorithms for implementing visual search, such as a scale invariant feature transform (SIFT) algorithm, may be deficient in terms of performing feature matching. Feature matching refers to an aspect of visual search algorithms during which search feature descriptors extracted from the search image are matched against the reference feature descriptors extracted from the reference images.

To illustrate these deficiencies, consider the SIFT algorithm, which may discard reference feature descriptors that would otherwise match a search feature descriptor in instances when the search feature descriptor and the reference feature descriptors each are extracted from a repeating feature of the search and reference images, such as distinctive arches or windows that repeat across a building. Moreover, the SIFT algorithm commonly only returns a single image in response to any given visual search, where this returned image is determined to be the "best match" algorithmically by the SIFT algorithm. However, users may not determine what constitutes a "best match" in the same way as the SIFT algorithm, which may result in user frustration as the single SIFT best match result may not match the user's expectations.

SUMMARY

In general, this disclosure describes techniques that facilitate feature matching when performing a visual search. The techniques may improve feature matching by providing a feature matching algorithm capable of providing ranked lists of search results. The techniques may improve robustness by providing a feature matching algorithm that accommodates repeating features. Rather than reject reference feature descriptors when two or more reference features that match the current search feature descriptor are located to close to one another, as provided by, for example, the SIFT algorithm (under the premise that if two or more matching reference feature descriptors are too close, these matching reference feature descriptors are not likely unique and therefore unlikely to facilitate classification of the search image), the techniques may utilize clustering algorithms to more properly determine uniqueness when performing feature matching. Moreover, the techniques may facilitate the generation and return of a ranked list of matching reference images rather than simply return a single reference image, as is common in conventional visual search algorithms. The ranked list of matching reference images may provide a user with an opportunity to select what the user considers as a "best match" rather than being forced to accept the algorithms determination of what constitutes a best match.

In one example, a method for performing a visual search with a visual search device, the method comprises computing, with the visual search device, a distance between a query feature descriptor provided by way of a visual search query and each of a plurality of reference feature descriptors, wherein the visual search query initiates the visual search. The method also comprises determining, with the visual search device, a first group of one or more of the computed distances and a second group of the computed distances in accordance with a clustering algorithm, wherein the first group of the computed distances includes those of the computed distances that indicate the associated one of the plurality of reference feature descriptors are near to the query feature descriptor relative to the those of the computed distances determined to be in the second group of computed distances, and wherein the second group of the computed distances includes those of the computed distances that indicate the associated one of the plurality of reference feature descriptors are far from the query feature descriptor relative to the those of the computed distances determined to be in the first group of computed distances. The method further comprises determining, with the visual search device, whether the query feature descriptor matches one of the plurality of reference feature descriptors associated with a smallest one of the computed distances based on the determined first group of the computed distances and the second group of the computed distances.

In another example, an apparatus for performing a visual search comprises means for computing a distance between a query feature descriptor provided by way of a visual search query and each of a plurality of reference feature descriptors, wherein the visual search query initiates the visual search. The apparatus also comprises means for determining a first group of one or more of the computed distances and a second group of the computed distances in accordance with a clustering algorithm, wherein the first group of the computed distances includes those of the computed distances that indicate the associated one of the plurality of reference feature descriptors are near to the query feature descriptor relative to the those of the computed distances determined to be in the second group of computed distances, and wherein the second group of the computed distances includes those of the computed distances that indicate the associated one of the plurality of reference feature descriptors are far from the query feature descriptor relative to the those of the computed distances determined to be in the first group of computed distances. The apparatus further comprises means for determining whether the query feature descriptor matches one of the plurality of reference feature descriptors associated with a smallest one of the computed distances based on the determined first group of the computed distances and the second group of the computed distances.

In another example, an apparatus for performing a visual search comprises an interface that receives a query feature descriptor and a feature matching unit that computes a distance between a query feature descriptor provided by way of a visual search query and each of a plurality of reference feature descriptors, wherein the visual search query initiates the visual search, determines a first group of one or more of the computed distances and a second group of the computed distances in accordance with a clustering algorithm, wherein the first group of the computed distances includes those of the computed distances that indicate the associated one of the plurality of reference feature descriptors are near to the query feature descriptor relative to the those of the computed distances determined to be in the second group of computed distances, and wherein the second group of the computed distances includes those of the computed distances that indicate the associated one of the plurality of reference feature descriptors are far from the query feature descriptor relative to the those of the computed distances determined to be in the first group of computed distances and determines whether the query feature descriptor matches one of the plurality of reference feature descriptors associated with a smallest one of the computed distances based on the determined first group of the computed distances and the second group of the computed distances.

In another example, a computer-readable medium comprising instruction that, when executed, cause one or more processors to compute a distance between a query feature descriptor provided by way of a visual search query and each of a plurality of reference feature descriptors, wherein the visual search query initiates the visual search, determine a first group of one or more of the computed distances and a second group of the computed distances in accordance with a clustering algorithm, wherein the first group of the computed distances includes those of the computed distances that indicate the associated one of the plurality of reference feature descriptors are near to the query feature descriptor relative to the those of the computed distances determined to be in the second group of computed distances, and wherein the second group of the computed distances includes those of the computed distances that indicate the associated one of the plurality of reference feature descriptors are far from the query feature descriptor relative to the those of the computed distances determined to be in the first group of computed distances and determine whether the query feature descriptor matches one of the plurality of reference feature descriptors associated with a smallest one of the computed distances based on the determined first group of the computed distances and the second group of the computed distances.

In another example, a system comprises a client device that transmits a query feature descriptor by way of a search query to initiate a visual search, a database that stores a plurality of reference query descriptors and a visual search server device that performs a visual search. The visual search server device comprises an interface that receives the query feature descriptor by way of the search query and a feature matching unit that computes a distance between the query feature descriptor and each of the plurality of reference feature descriptors, determines a first group of one or more of the computed distances and a second group of the computed distances in accordance with a clustering algorithm, wherein the first group of the computed distances includes those of the computed distances that indicate the associated one of the plurality of reference feature descriptors are near to the query feature descriptor relative to the those of the computed distances determined to be in the second group of computed distances, and wherein the second group of the computed distances includes those of the computed distances that indicate the associated one of the plurality of reference feature descriptors are far from the query feature descriptor relative to the those of the computed distances determined to be in the first group of computed distances and determines whether the query feature descriptor matches one of the plurality of reference feature descriptors associated with a smallest one of the computed distances based on the determined first group of the computed distances and the second group of the computed distances.

The details of one or more examples are set forth in the accompanying drawings and the description below. Other features, objects, and advantages will be apparent from the description and drawings, and from the claims.

DETAILED DESCRIPTION

Figure 1:
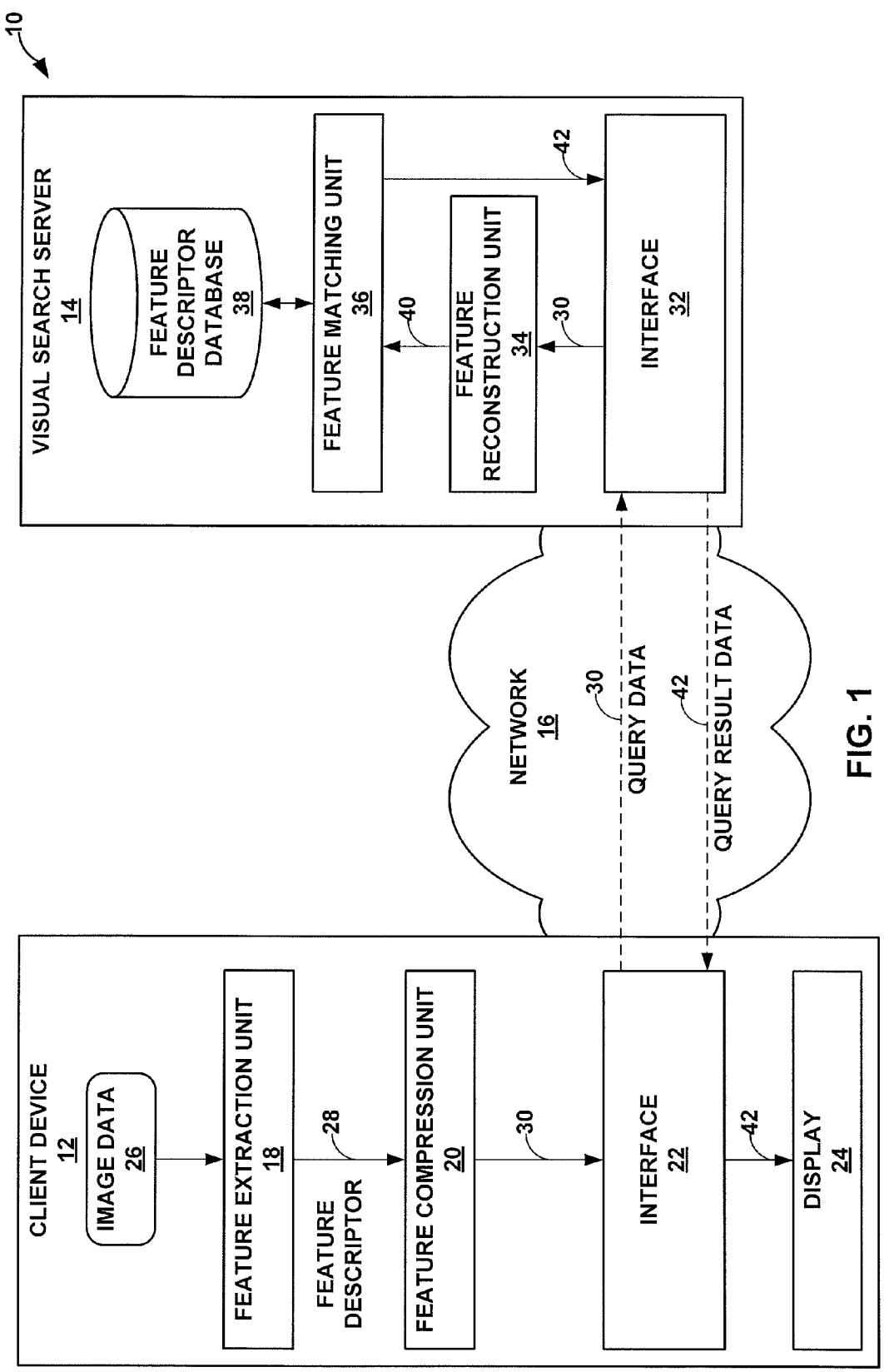
FIG. 1 is a block diagram illustrating an image processing system that implements the robust feature descriptor matching techniques described in this disclosure.

FIG. 1 is a block diagram illustrating an image processing system 10 that implements the robust feature matching techniques described in this disclosure. In the example of FIG. 1, image processing system 10 includes a client device 12, a visual search server 14 and a network 16. Client device 12 represents in this example a mobile device, such as a laptop, a so-called netbook, a personal digital assistant (PDA), a cellular or mobile phone or handset (including so-called "smartphones"), a global positioning system (GPS) device, a digital camera, a digital media player, a game device, or any other mobile device capable of communicating with visual search server 14. While described in this disclosure with respect to a visual search server 14, the techniques of described in this disclosure should not be limited to visual search servers. Instead, the techniques may be implemented by any device capable of implementing feature matching aspects of a local feature-based visual search algorithms.

Visual search server 14 represents a server device that accepts connections typically in the form of transmission control protocol (TCP) connections and responds with its own TCP connection to form a TCP session by which to receive query data and provide identification data. Visual search server 14 may represent a visual search server device in that visual search server 14 performs or otherwise implements a local feature-based visual search algorithm to identify one or more features or objects within one or more reference images.

Network 16 represents a public network, such as the Internet, that interconnects client device 12 and visual search server 14, although network 16 could also be a private network. Commonly, network 16 implements various layers of the open system interconnection (OSI) model to facilitate transfer of communications or data between client device 12 and visual search server 14. Network 16 typically includes any number of network devices, such as switches, hubs, routers, servers, to enable the transfer of the data between client device 12 and visual search server 14. While shown as a single network, network 16 may comprise one or more sub-networks that are interconnected to form network 16. These sub-networks may comprise service provider networks, access networks, backend networks or any other type of network commonly employed in a public network to provide for the transfer of data throughout network 16. While described in this example as a public network, network 16 may comprise a private network that is not generally accessible by the public.

As shown in the example of FIG. 1, client device 12 includes a feature extraction unit 18, a feature compression unit 20, an interface 22 and a display 24. Feature extraction unit 18 represents a unit that performs feature extraction in accordance with a feature extraction algorithm, such as a scale invariant feature transform algorithm or any other feature description extraction algorithm that provides for the extraction of features. Generally, feature extraction unit 18 operates on image data 26, which may be captured locally using a camera or other image capture device (not shown in the example of FIG. 1) included within client device 12. Alternatively, client device 12 may store image data 26 without capturing this image data itself by way of downloading this image data 26 from network 16, locally via a wired connection with another computing device or via any other wired or wireless form of communication.

While described in more detail below, feature extraction unit 18 may, in summary, extract a feature descriptor 28 by Gaussian blurring image data 26 to generate two consecutive Gaussian-blurred images. Guassian blurring generally involves convolving image data 26 with a Gaussian blur function at a defined scale. Feature extraction unit 18 may incrementally convolve image data 26, where the resulting Gaussian-blurred images are separated from each other by a constant in the scale space. Feature extraction unit 18 may stack these Gaussian-blurred images to form what may be referred to as a "Gaussian pyramid" or a "difference of Gaussian pyramid." Feature extraction unit 18 compares two successively stacked Gaussian-blurred images to generate difference of Gaussian (DoG) images. The DoG images may form what is referred to as a "DoG space."

Based on this DoG space, feature extraction unit 18 may detect keypoints, where a keypoint refers to a region or patch of pixels around a particular sample point or pixel in image data 26 that is potentially interesting from a geometric perspective. Generally, feature extraction unit 18 identifies keypoints as local maxima and/or local minima in the constructed DoG space. Feature extraction unit 18 then assigns these keypoints one or more orientations, or directions, based on directions of a local image gradient for the patch in which the keypoint was detected. To characterize these orientations, feature extraction unit 18 may define the orientation in terms of a gradient orientation histogram. Feature extraction unit 18 then defines feature descriptor 28 as a location and an orientation (e.g., by way of the gradient orientation histogram). After defining feature descriptor 28, feature extraction unit 18 outputs this feature descriptor 28 to feature compression unit 20. Typically, feature extraction unit 18 outputs a set of feature descriptors 28 using this process to feature compression unit 20.

Feature compression unit 20 represents a unit that compresses or otherwise reduces an amount of data used to define feature descriptors, such as feature descriptors 28, relative to the amount of data used by feature extraction unit 18 to define these feature descriptors. To compress feature descriptors 28, feature compression unit 20 may perform a form of quantization referred to as type quantization to compress feature descriptors 28. In this respect, rather than send the histograms defined by feature descriptors 28 in its entirety, feature compression unit 20 performs type quantization to represent the histogram as a so-called "type." Generally, a type is a compressed representation of a histogram (e.g., where the type represents the shape of the histogram rather than the full histogram). The type generally represents a set of frequencies of symbols and, in the context of histograms, may represent the frequencies of the gradient distributions of the histogram. A type may, in other words, represent an estimate of the true distribution of the source that produced a corresponding one of feature descriptors 28. In this respect, encoding and transmission of the type may be considered equivalent to encoding and transmitting the shape of the distribution as it can be estimated based on a particular sample (i.e., which is the histogram defined by a corresponding one of feature descriptors 28 in this example).

Given feature descriptors 28 and a level of quantization (which may be mathematically denoted herein as "n"), feature compression unit 20 computes a type having parameters $k_1, \ldots k_m$ (where m denotes the number of dimensions) for each of feature descriptors 28. Each type may represent a set of rational numbers having a given common denominator, where the ration numbers sum to one. Feature descriptors 28 may then encode this type as an index using lexicographic enumeration. In other words, for all possible types having the given common denominator, feature compression unit 20 effectively assigns an index to each of these types based on a lexicographic ordering of these types. Feature compression unit 20 thereby compresses feature descriptors 28 into single lexicographically arranged indexes and outputs these compressed feature descriptors in the form of query data 30 to interface 22.

Interface 22 represents any type of interface that is capable of communicating with visual search server 14 via network 16, including wireless interfaces and wired interfaces. Interface 22 may represent a wireless cellular interface and include the necessary hardware or other components, such as antennas, modulators and the like, to communicate via a wireless cellular network with network 16 and via network 16 with visual search server 14. In this instance, although not shown in the example of FIG. 1, network 16 includes the wireless cellular access network by which wireless cellular interface 22 communicates with network 16. Display 24 represents any type of display unit capable of displaying images, such as image data 26, or any other types of data. Display 24 may, for example, represent a light emitting diode (LED) display device, an organic LED (OLED) display device, a liquid crystal display (LCD) device, a plasma display device or any other type of display device.

Visual search server 14 includes an interface 32, a feature reconstruction unit 34, a feature matching unit 36 and a feature descriptor database 38. Interface 32 of visual search server 14 may be similar to interface 22 of client device 12 in that interface 32 may represent any type of interface capable of communicating with a network, such a network 16. Feature reconstruction unit 34 represents a unit that decompresses compressed feature descriptors to reconstruct the feature descriptors from the compressed feature descriptors. Feature reconstruction unit 34 may perform operations inverse to those performed by feature compression unit 20 in that feature reconstruction unit 34 performs the inverse of quantization (often referred to as reconstruction) to reconstruct feature descriptors from the compressed feature descriptors.

Feature matching unit 36 represents a unit that performs feature matching to identify one or more features or objects in image data 26 based on reconstructed feature descriptors. Feature matching unit 36 may access feature descriptor database 38 to perform this feature identification, where feature descriptor database 38 stores data defining feature descriptors and associating at least some of these feature descriptors with reference images that include the corresponding feature or object extracted from image data 26. These reference images may also be associated with identification data that identifies one or more subjects, features or objects of the reference images. Database 38 may store this data using a compressed k-dimensional tree (KD tree).

Upon successfully identifying the feature or object extracted from image data 26 based on reconstructed feature descriptors, such as reconstructed feature descriptor 40 (which may also be referred to herein as "query data 40" in that this data represents visual search query data used to perform a visual search or query), feature matching unit 36 returns one or more matching reference images and any associated identification data as query result data 42.

Initially, a user of client device 12 interacts with client device 12 to initiate a visual search. The user may interact with a user interface or other type of interface presented by display 24 to select query image data 26 and then initiate the visual search to identify one or more features or objects that are the focus of the image stored as query image data 26. For example, query image data 26 may specify an image of a landmark, such as the Leaning Tower of Pisa. The user may have captured this image using an image capture unit (e.g., a camera) of client device 12 or, alternatively downloaded this image from network 16 or, locally, via a wired or wireless connection with another computing device. In any event, after selecting query image data 26, the user initiates the visual search to, in this example, identify the landmark.

In response to initiating the visual search, client device 12 invokes feature extraction unit 18 to extract at least one feature descriptor 28 and, typically, a number of feature descriptors 28, describing one of the so-called "keypoints" found through analysis of query image data 26. Feature extraction unit 18 forwards this query feature descriptor 28 to feature compression unit 20, which proceeds to compress query feature descriptor 28 and generate query data 30. Feature compression unit 20 outputs query data 30 to interface 22, which forwards query data 30 via network 16 to visual search server 14.

Interface 32 of visual search server 14 receives query data 30. In response to receiving query data 30, visual search server 14 invokes feature reconstruction unit 34. Feature reconstruction unit 34 reconstructs query feature descriptors 28 based on query data 30 and outputs reconstructed feature descriptors 40. Feature matching unit 36 receives reconstructed query feature descriptors 40 and performs feature matching based on query feature descriptors 40. Feature matching unit 36 performs feature matching by, for each of query feature descriptors 40, accessing feature descriptor database 38 and traversing reference feature descriptors stored as data by feature descriptor database 38 to identify a substantially matching feature descriptor. Upon successfully identifying the feature extracted from image data 26 based on reconstructed query feature descriptors 40, feature matching unit 36 outputs one or more matching reference images associated with matching reference feature descriptors and any associated identification data as query result data 42. Interface 32 receives this query result data 42 and forwards query result data 42 via network 16 to client device 12.

Interface 22 of client device 12 receives this query result data 42 and generally forwards this query result data 42 to whatever application invoked the search query. That is, client device 12 typically executes one or more applications that may invoke the visual search and manage the presentation of returned query result data, such as query result data 42. This application may interface with display 24 to present query result data 42. In some instances, the application may perform Internet searches or other operations to retrieve additional information based on the identification data defined by query result data 42 to augment query result data 42. In this instance, identification data of query result data 42 may comprise a name the landmark, i.e., the Leaning tower of Pisa in this example, the name of the builders that built the Leaning Tower of Pisa, the data of completion of the Leaning Tower of Pisa and any other information related to this landmark.

While visual search may facilitate user interaction with client devices having smaller screens and/or limited input mechanisms (such as a virtual keyboard that provides little haptic feedback that may limit or frustrate input of text by the user) and generally provide a number of benefits in terms of facilitating various applications, in some instances, some visual search algorithms, such as the scale invariant feature transform (SIFT) algorithm, may be deficient in terms of performing feature matching. To illustrate these deficiencies, the SIFT algorithm may discard reference feature descriptors that would otherwise match a search or query feature descriptor in instances when the query feature descriptor and the reference feature descriptors each are extracted from a repeating feature of the search and reference images, such as distinctive arches or windows that repeat across a building (e.g., the Leaning Tower of Pisa). Moreover, the SIFT algorithm commonly only returns a single image in response to any given visual search, where this returned image is determined to be the "best match" algorithmically by the SIFT algorithm. However, users may not determine what constitutes a "best match" in the same way as the SIFT algorithm, which may result in user frustration as the single SIFT best match result may not match the user's expectations.

More specifically, visual search algorithms, including the SIFT algorithm, implements feature matching using what may be referred to as a "similarity measure." The SIFT algorithm uses a distance ratio test to measure how similar a query feature descriptor is to each of the reference feature descriptors. This distance ratio measures how far (in the feature descriptor space) the closest reference feature descriptor of a current one of the query feature descriptors is to the second closest (again in the feature descriptor space) feature descriptor of the current one of the query feature descriptors. If the closest and second closest reference feature descriptor are very close (as identified by a threshold), the SIFT algorithm determines that the current one of the query feature descriptor is not unique and, therefore, the match is not reliable. This distance ratio similarity measure can be represented by the following equation (1):

$$\text{if } \frac{d(q, nn_1)}{d(q, nn_2)} < T, \text{ accept as match; else reject match.} \quad (1)$$

In equation (1), q represents the query descriptor, nn1 represents the closest reference feature descriptor (which may also be referred to as the "nearest neighbor" or "nn") in the database and nn2 represents the second closest reference feature descriptor in the database (which may be referred to as the "second nearest neighbor"), d represents an L2 norm operation, T represents a threshold.

While the SIFT distance ratio similarity measure typically provides suitable results, the SIFT distance ratio similarity measure may fail to correctly identify a matching reference feature descriptor in certain instances. For example, in instances where an image contains repeating structures (such as the repeated window structures of the Leaning Tower of Pisa shown in the example of FIG. 7), the SIFT distance ratio similarity measure may determine that query feature descriptors extracted from such repeated image features are not unique considering the distance between its two closest reference feature descriptors (which were also extracted from image data depicting the Leaning Tower of Pisa) may be small. In this instance, the SIFT distance ratio similarity measure may reject a potentially correct match.

In accordance with the techniques described in this disclosure, feature matching unit 36 of visual search server 14 employs a more robust distance ratio similarity measure that may accommodates repeating structures and otherwise facilitates more accurate matching in these and other instances. Moreover, the techniques may provide an ordered ranking of reference images to accommodate differences in algorithmic determination and user perception of a "best match" rather than simply return a single "best matching" reference image as is common in conventional systems.

In implementing the distance ratio similarity measure according to the techniques described in this disclosure, feature matching unit 36 may first compute a distance between one of reconstructed query feature descriptors 40 and each of a plurality of reference feature descriptors stored to feature descriptor database 38. Feature matching unit 36 may then determine a first group of one or more of the computed distances and a second group of the computed distances using a clustering algorithm. Common clustering algorithms may comprise a k-means clustering algorithm (where k is set to two in this example to produce the first and second groups), a Gaussian fitting algorithm and a graph cutting algorithm.

In some instances, the clustering algorithm may comprise an algorithm that clusters the nearest or smallest distance into the first group and a plurality of the next nearest or smallest distances into the second group, where the number of the plurality of next nearest or smallest distances of the second group may, for example, include two, three or four of the next nearest distances. While described herein with respect to more formal clustering algorithms, such as a k-means clustering algorithm, any algorithm capable of determining two or more groups, where a first group includes one or more distances and the second group includes two or more distances may be utilized with respect to the techniques described in this disclosure.

Using the clustering algorithm, feature matching unit 36 may determine the first group of one or more of the computed distances such that this first group includes those of the computed distances indicating that an associated one of the plurality of reference feature descriptors stored to feature descriptor database 38 are near to the query feature descriptor relative to the those of the computed distances determined to be in the second group of computed distances. Also using this clustering algorithm, feature matching unit 36 may determine the second group of the computed differences such that this second group includes those of the computed distances indicating that an associated one of the plurality of reference feature descriptors stored to feature descriptor database 38 are far from the current one of query feature descriptors 40 relative to the those of the computed distances determined to be in the first group of the computed distances.

Feature matching unit 36 of visual search server 14 may then determine whether the current one of query feature descriptors 40 matches one of the plurality of reference feature descriptors associated with a smallest one of the computed distances based on the determined first group of the computed distances and the second group of the computed distances. For example, feature matching unit 36 may first compute an average of the computed distances determined to be in the first group to generate a first group distance average and, likewise, compute an average of the computed distances determined to be in the second group to generate a second group distance average. Upon computing the first and second group distance averages, feature matching unit 36 may divide the first group distance average by the second group distance average to generate an average distance ratio measure. Feature matching unit 36 may next compare the average distance ratio measure to a threshold value and determine whether the current one of query feature descriptors 40 matches the one of the plurality of reference feature descriptors associated with the smallest one of the computed distances based on the comparison.

By clustering or otherwise grouping the computed distances in this manner and then averaging the distances of each group, the techniques may accommodate matching of feature descriptors extracted from adjacent repeating features without blankly rejecting any reference feature descriptors that are near one another and both match the query feature descriptor as is common conventionally. The grouping of distance measures using the clustering algorithm may also achieve a clearer distinction between near and far feature descriptors, such that feature matching unit 36 of visual search server 14 may correctly identify distinct or unique feature descriptors from one another using distance. By averaging the distance measures, feature matching unit 36 may provide a relatively close approximation of how far these two groups are from one another so as to correctly apply the threshold and thereby avoid rejecting what would be considered a matching reference feature descriptor.

To implement the ordered or ranked list of matching images aspects of the techniques, feature matching unit 36 of visual search server 14 utilizes the first group of the computed distances that are relatively near the current one of query feature descriptors 40 in comparison to the second group of computed distances. For all of the computed distances determined to be in the first group and that are determined to match using the more robust distance similarity measure described above, feature matching unit 36 may assign a vote to the distinctive images associated with the matching reference feature descriptors that correspond to the computed distances of the first group. That is, if multiple ones of the reference feature descriptors corresponding to the computed distances of the first group are extracted from the same reference image, feature matching unit 36 assigns a single vote to that reference image.

For example, feature matching unit 36 may determine a group of unique reference images such that the group of reference images does not include any duplicate reference images. Feature matching unit 36 may first consider the reference feature descriptors from which the computed distances determined to be in the first group were computed, where these reference feature descriptors may be referred to as "first group reference feature descriptors." Each reference feature descriptor is associated with a reference image (which may also be stored to feature descriptor database 38 or some other database, memory or storage unit not shown in the example of FIG. 1) from which that reference feature descriptor was extracted when initially building feature descriptor database 38. Feature matching unit 36 may then determine an initial group of reference images as those reference images associated with the first group reference feature descriptors. Feature matching unit 36 may then remove any duplicate reference images from the initial group of reference images to generate the group of unique reference images such that the group of reference images does not include any duplicate reference images.

Feature matching unit 36 may then assign a vote to each of the references images determined to be in the group of unique reference images. The vote may be a constant, such as one. Alternatively, the vote may be proportional to a distance ratio of the current computed distance compared to the computed distance between the current one of query feature descriptors 40 and a closest reference feature descriptor. As another alternatively, the vote may be proportional to the ranking within the first group when the computed distances of the first group are ordered from smallest to largest (e.g., if one of the first group reference feature descriptors is the fifth closest to the current one of query feature descriptors 40, the vote would be ⅕). Feature matching unit 36 then assigns votes in this manner for each of query feature descriptors 40. After the votes have been assigned to the reference or target images in this manner, feature matching unit 36 may then rank the reference or target images based on the collected votes and provide the rank or ordered list of target images in response to query data 30 in the form of query result data 42.

While various components, modules, or units are described in this disclosure to emphasize functional aspects of devices configured to perform the disclosed techniques, these units do not necessarily require realization by different hardware units. Rather, various units may be combined in a hardware unit or provided by a collection of inter-operative hardware units, including one or more processors as described above, in conjunction with suitable software and/or firmware stored to computer-readable mediums. In this respect, reference to units in this disclosure is intended to suggest different functional units that may or may not be implemented as separate hardware units and/or hardware and software units. Note that the phrase "computer readable medium" as used herein applies only to manufactures and does not apply to transitory propagating signals.

Figure 2:
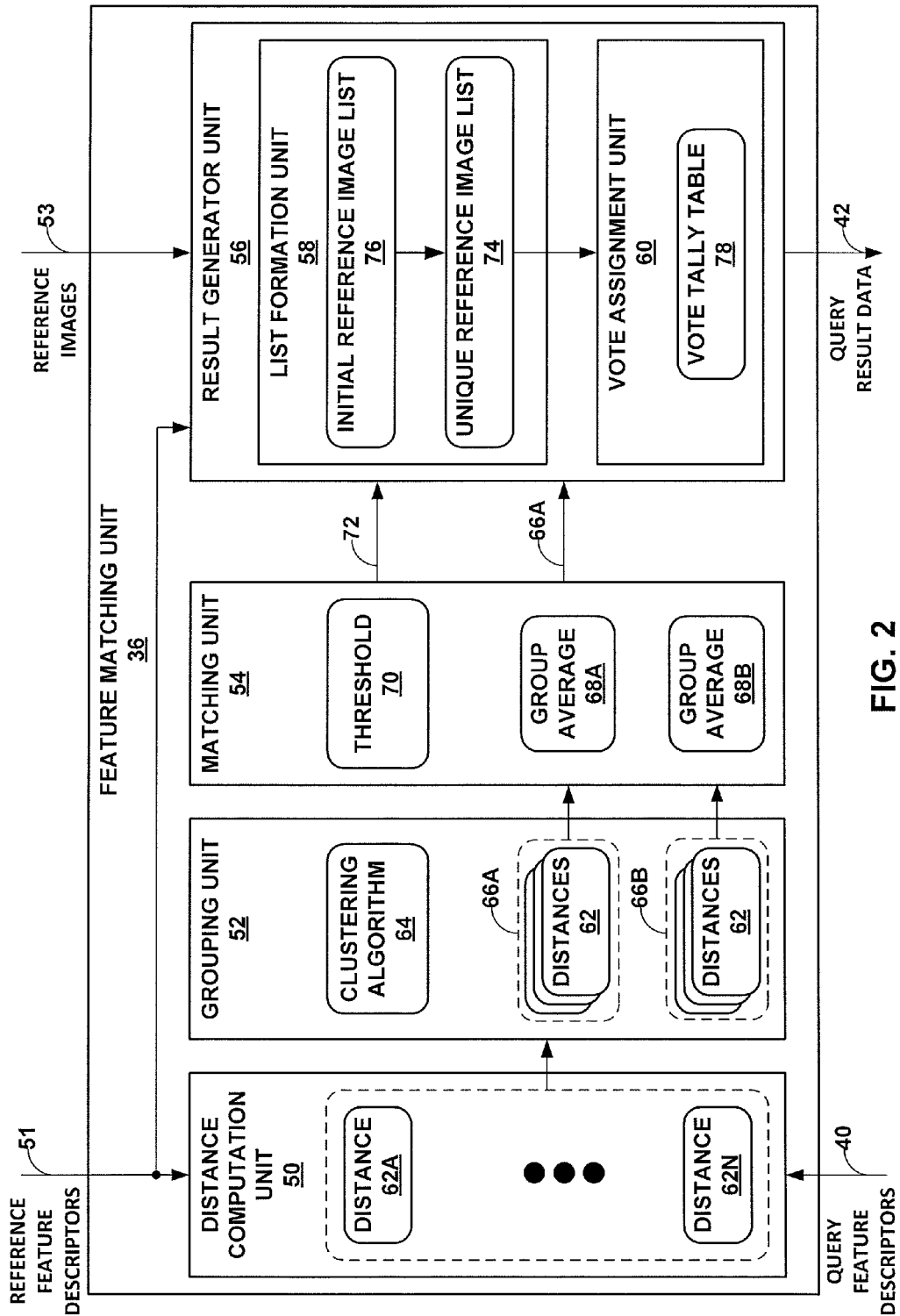
FIG. 2 is a block diagram illustrating a feature matching unit of FIG. 1 in more detail.

FIG. 2 is a block diagram illustrating feature matching unit 36 shown in the example of FIG. 1 in more detail. In the example of FIG. 2, feature matching unit 36 includes a distance computation unit 50, a grouping unit 52, a matching unit 54 and a result generator unit 56. Distance computation unit 50 represents a unit that computes distances 62A-62N ("distances 62") based on reference feature descriptors 51 stored to feature descriptor database 38 and query feature descriptors 40. More specifically, distance computation unit 50 may represent a unit that computes distances 62 for each of query feature descriptors 40 as an absolute value of subtracting each of reference feature descriptors 51 from a current one of query feature descriptors 40. Distance computation unit 50 outputs distances 62 to grouping unit 52.

Grouping unit 52 represents a unit that receives distances, such as distances 62, or any other non-empty set of two or more values and groups these values into at least two groups in accordance with a clustering algorithm 64. Clustering algorithm 64 may represent one or more of a k-means clustering algorithm (where k is set to two in this example to produce the first and second groups), a Gaussian fitting algorithm and a graph cutting algorithm, as well as, any other common clustering algorithm capable of generating at least two groups from a set of values. In the example of FIG. 2, grouping unit 52 receives distances 62 and computes groups 66A, 66B ("groups 66") of different ones of distances 62 in accordance with clustering algorithm 64. Grouping unit 52 may determine group 66A of two or more of the computed distances 62 such that this first group 66A includes those of the computed distances 62 indicating that an associated one of reference feature descriptors 51 stored to feature descriptor database 38 are near to the current one of query feature descriptors 40 relative to the those of computed distances 62 determined to be in group 66B of computed distances 62. Also in accordance with clustering algorithm 64, grouping unit 52 may determine group 66B of computed distances 62 such that this second group 66B includes those of computed distances 62 indicating that an associated one of reference feature descriptors 51 are far from the current one of query feature descriptors 40 relative to the those of the computed distances determined to be in the first group of the computed distances. Grouping unit 52 outputs groups 66 of distances 62 to matching unit 54.

Matching unit 54 represents a unit that determines whether the current one of query feature descriptors 40 uniquely matches one or more of reference feature descriptors 51. To determine whether the current one of query feature descriptors 40 uniquely matches one or more of reference feature descriptors 51, matching unit 54 typically computes an average of the values of each of the provided groups. In the example of FIG. 2, matching unit 54 computes group averages 68A, 68B by averaging distances 62 of group 66A and distances 62 of group 66B, respectively. Next, matching unit 54 divides group average 68A by group average 68B and compares the result to threshold 70. That is, matching unit 54 generally performs a similar comparison to that currently performed by the SIFT algorithm (and shown above as equation (1)) only with respect to group averages computed from groups 66 of distances 62 formed using clustering algorithm 64.

If the result of dividing group average 68A by group average 68B is greater than the threshold (meaning reference feature descriptors 51 associated with group 66B are close to those associated with group 66A), matching unit 54 outputs a match indicator 72 indicating that the current one of feature descriptors 40 does not uniquely match any of reference feature descriptors 51. The term "unique match" is used herein to refer to the aspect of feature matching in the context of performing a visual search where a match may exist but may not facilitate identification of the query image data and therefore the match is not considered unique. A match is unique if the match facilitates the identification of the query image data. For example, the arches on the Leaning Tower of Pisa may be extracted from a query image of the Leaning Tower of Pisa as query feature descriptors that may uniquely identify this landmark. Reference feature descriptors extracted from these arches in a reference image of the Leaning Tower of Pisa may match. Rather than reject these matching reference image feature descriptors as was common in conventional SIFT algorithm considering the repeating nature of these arches and the narrow definition of uniqueness, matching unit 54 may properly determine that these uniquely match despite the repetition due to the clustering nature of the data on which matching unit 54 operates. This unique match may also be referred to as the similarity measure described above. Unique matches are preferred as they facilitate identification of the query image data more quickly than non-unique matches, which is the reason matching unit 54 rejects non-unique matches.

In any event, if the result of dividing group average 68A by group average 68B is less than the threshold (meaning reference feature descriptors 51 associated with group 66B are far from those associated with group 66A), matching unit 54 outputs a match indicator 72 indicating that the current one of feature descriptors 40 uniquely matches the one of reference feature descriptors 51 associated with the smallest one of distances 62. Matching unit 54 outputs this match indicator 72 and forwards group 66A to result generator unit 56. In some instances, matching unit 54 only forwards group 66A if match indicator 72 indicates a match, as result generator unit 56 need not consider group 66A when matching unit 54 has determined that no match exists.

Result generator unit 56 represents a unit that generates query result data 42. Result generator unit 56 includes a list formation unit 58 and a vote assignment unit 60. List formation unit 58 represents a unit that forms a list of unique reference images 74 based on group 66A. More specifically, list formation unit 58 may, when matching indicator 72 signals a match, process group 66A to determine those of reference feature descriptors 51 from which distances 62 of group 66A were computed. List formation unit 58 then retrieves reference images 53 from which each of these ones of reference feature descriptors 51 was extracted and forms initial reference image list 76. List formation unit 58 may then remove any redundant images from initial reference image list 76 to generate unique reference image list 74.

Although described as forming initial reference image list 76, list formation unit 58 may not necessarily form such a list 76 but may instead retrieve only unique ones of reference images 53. That is, list formation unit 58 may, when retrieving reference images 53 from which the determined ones of reference feature descriptors 51 were extracted, first determine whether it has already retrieves this one of images 53 and then only retrieve this one of images 53 if it has not already retrieved this one of images 53. By avoiding storing copies or duplicates of images 53, list formation unit 58 may avoid consuming memory, which may enable an implementer to reduce memory requirements. For this reason, the techniques should not be limited to any one way by which to compute unique reference image list 74. As such, regardless of how list formation unit 58 computes unique reference image list 74, list formation unit 58 outputs unique reference image list 74 to vote assignment unit 60.

Vote assignment unit 60 represents a unit that assigns votes to one or more of reference images 53. Typically, vote assignment unit 60 assigns votes to images 53 identified by unique reference image list 74 by associating each of these images 53 with an entry in a vote tally table 78. Vote assignment unit 60 may update each entry associated with images 53 to increment a vote count of each entry. Vote assignment unit 60 may determine the votes in any number of ways, including those described above. That is, the vote may be a constant value, such as one. Alternatively, the vote may be proportional to a distance ratio of the current computed distance compared to the computed distance between the current one of query feature descriptors 40 and a closest reference feature descriptor. As another alternatively, the vote may be proportional to the ranking within the first group when the computed distances of the first group are ordered from smallest to largest (e.g., if one of the first group reference feature descriptors is the fifth closest to the current one of query feature descriptors 40, the vote would be ⅕).

Distance computation unit 50, grouping unit 52, matching unit 54 and result generator unit 56 may continue in the manner described above until all of query feature descriptors 40 have undergone this feature matching process. After processing the last one of query feature descriptors 40, result generator unit 56 constructs query result data 42 based on vote tally table 78. For example, result generator unit 56 may retrieve those of reference images 53 that received the most votes, the second most votes, the third most votes and so on to some limit or threshold and output these images 53 as query result data 42 (along with metadata or other data describing or otherwise associated each of these images in feature descriptor database 38). Alternatively, result generator unit 56 may form query result data 42 as any of images 53 that received a vote (again, along with metadata or other data describing or otherwise associated each of these images in feature descriptor database 38).

Figure 3A:
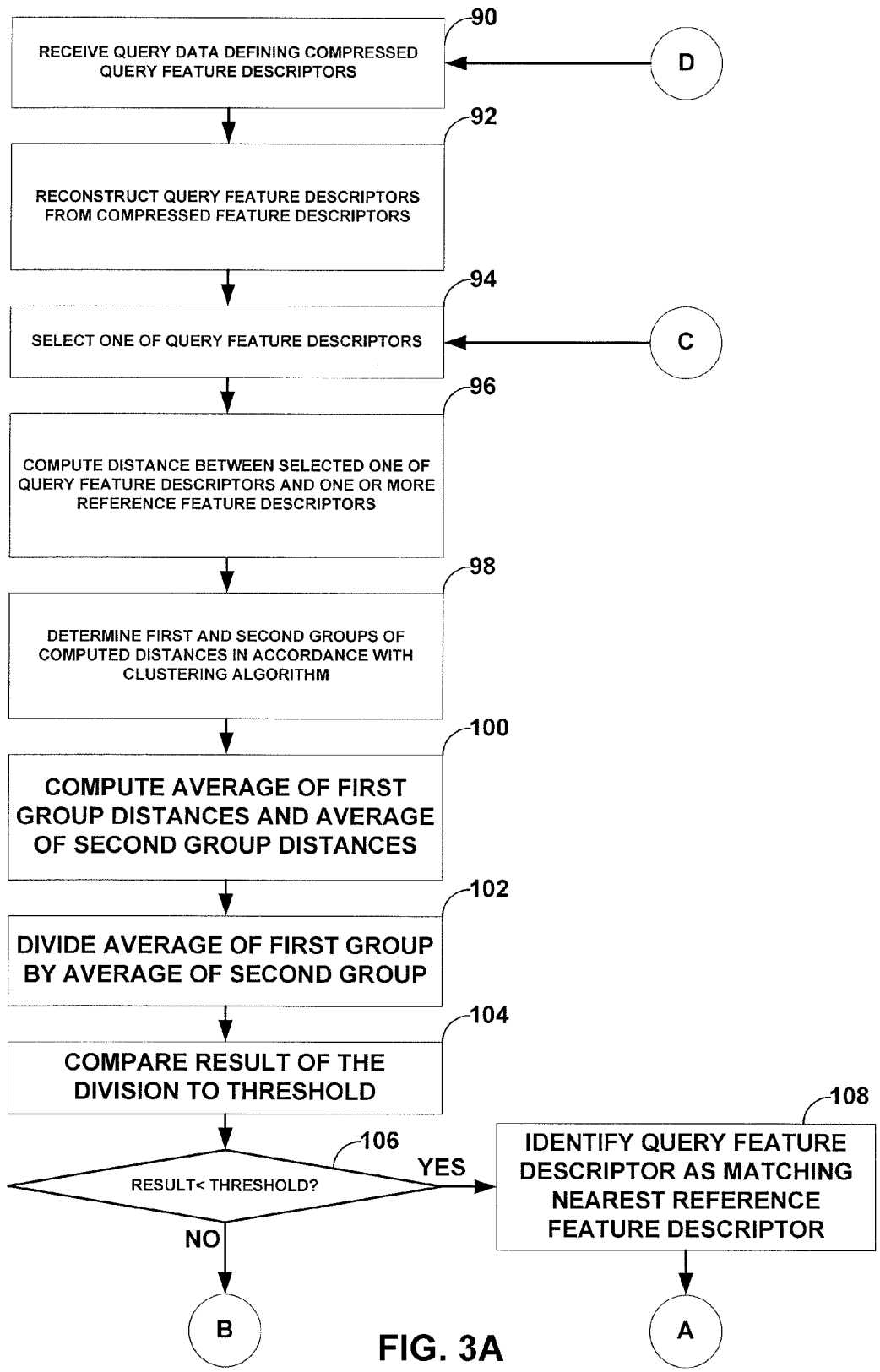
FIGS. 3A and 3B are flowcharts illustrating exemplary operation of a visual search server in implementing the feature matching techniques described in this disclosure.
Figure 3B:
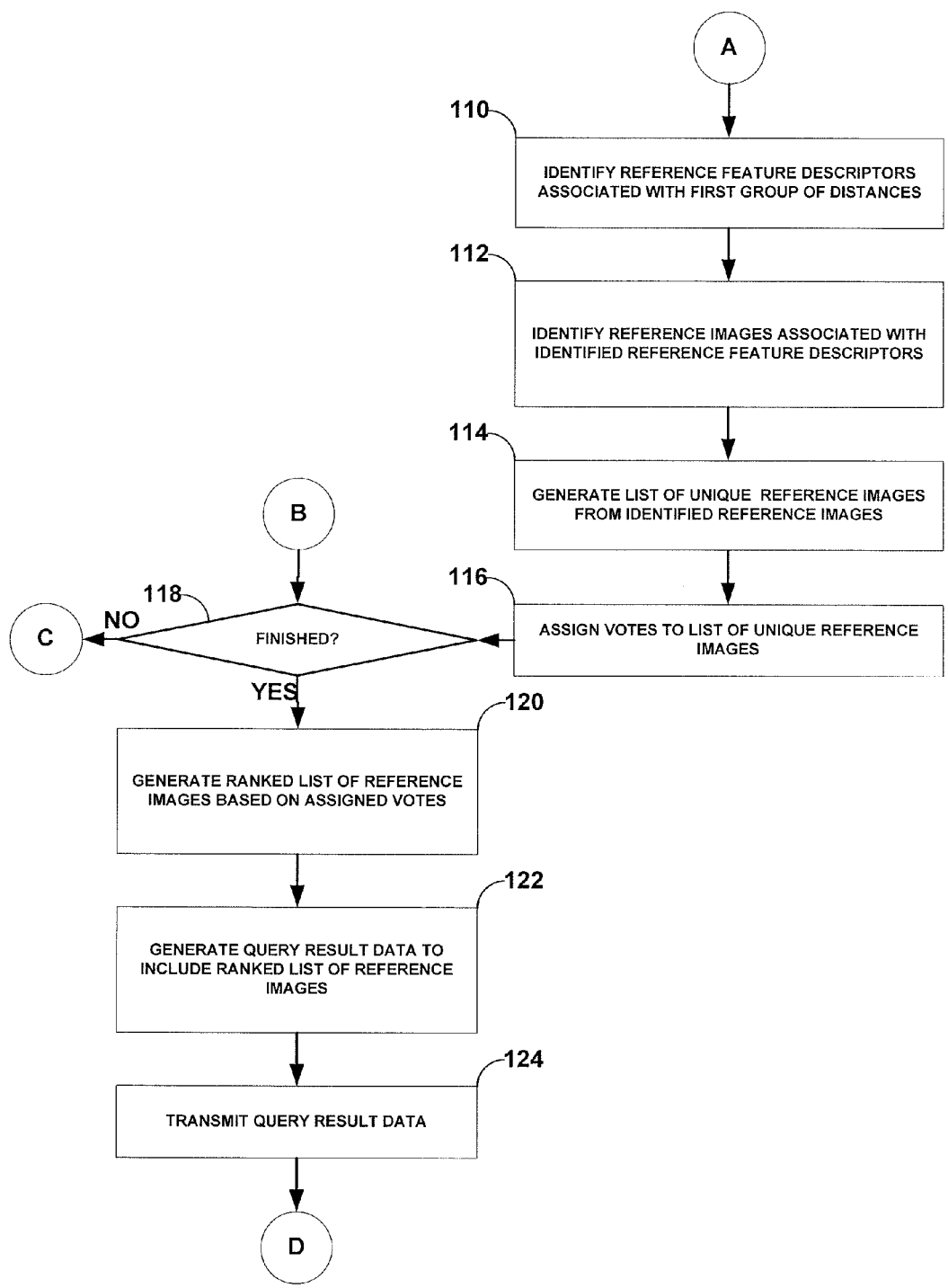

FIG. 3. is a flowchart illustrating exemplary operation of a visual search server, such as visual search server 14 shown in the example of FIG. 1, in implementing the feature matching techniques described in this disclosure. Initially, visual search server 14 receives via interface 32 query data 30 that typically defines compressed feature descriptors (90). Feature reconstruction unit 34 of visual search server 14 reconstructs query feature descriptors 28 from compressed feature descriptors defined by query data 30 to generate reconstructed feature descriptors 40 (92). Feature reconstruction unit 34 outputs reconstructed query feature descriptors 40 to feature matching unit 36.

Feature matching unit 36 receives these query feature descriptors 40 with a distance computation unit 50 (as shown in the example of FIG. 2). Distance computation unit 50 selects one of query feature descriptors 40 (94). Distance computation unit 50 then computes a distance between the selected one of query feature descriptors 40 and one or more of reference feature descriptors 51 stored to feature descriptor database 38 in the manner described above (96). These distances are shown in the example of FIG. 2 as distances 62. Distance computation unit 50 outputs these distances 62 to grouping unit 52.

Upon receiving these distances 62, grouping unit 52 determines first and second groups 66A, 66B of computed distances 62 in accordance with clustering algorithm 64 (98). First group 66A includes a different non-zero set of distances 62 from a set of non-zeros distances 62 of second group 66B. That is, distances 62 are divided into first and second groups 66 such that no one of distances 62 is associated with both of groups 66. Grouping unit 52 output groups 66 to matching unit 54.

In response to receiving groups 66, matching unit 54 computes an average of first group distances 66A and an average of second group distances 66B (100). These averages are shown in the example of FIG. 1 as group average 68A and group average 68B, where group average 68A represents the computed average of distances 62 of group 66A and group average 68B represents the computed average of distances 62 of group 66B. Matching unit 54 then divides group average 68A by group average 68B, comparing the result of the division to threshold 70 to determine whether the result of the division is less than threshold 70 (102-106). If the result is less than threshold 70 ("YES" 106), matching unit 54 generates match indicator 72 that identifies that the selected one of query feature descriptors 40 matches the determined nearest one of reference feature descriptors 51 (in terms of distances 62) (108). Matching unit 54 forwards match indicator 72 and first group 66A to result generator unit 56.

Result generator unit 56 receives match indicator 72 and group 66A. In response to receiving match indicator 72 and group 66A, result generator unit 56 invokes list formation unit 58. List formation unit 58 generates initial reference image list 76 by first identifying reference feature descriptors 51 associated with first group 66A of distances 62 in the manner described above (110). List formation unit 58 next identifies reference images 53 associated with identified ones of reference feature descriptors 51, again in the manner described above (112). List formation unit 58 may store identified reference images 53 as initial reference image list 76. Also as described above, list formation unit 58 then generates a list of unique reference images 53 based on identified reference feature descriptors 51 (or initial reference image list 76), where this list is shown in the example of FIG. 2 as unique reference image list 74 (114). Result generator unit 56 may next invoke vote assignment unit 60, which assigns votes to the list of unique reference images 53 (or unique reference image list 74) in the manner described above (116). Vote assignment unit 60 may maintain vote tally table 78 to assign votes to those reference images 53 identified by unique reference image list 74.

Feature matching unit 36 then determines whether it has finished processing all of query feature descriptors 40 in the manner described above (118). Alternatively, if matching unit 54 determined that the result of dividing group average 68A by group average 68B is not less than threshold 70 (referring back to FIG. 3A, "NO" 106), feature matching unit 36 may likewise determine whether it has finished processing all of query feature descriptors 40 in the manner described above (118). Regardless of in what context it determines whether it has finished processing all of query feature descriptors 40, if not finished processing all of query feature descriptors 40 ("NO" 118), units 50-60 operate in the manner described to process the remaining query feature descriptors 40 (94-118).

However, if finished processing all of query feature descriptors 40 ("YES" 118), vote assignment unit 60 may generate a ranked list of reference images 53 based on the assigned votes (as defined by vote tally table 78) in the manner described above (120). Result generator unit 56 may then generate query result data 42 to include the ranked list of reference images 53 (122). Result generator unit 56 may then transmit query result data 42 via interface 32 to client device 12 (124).

Figure 4:
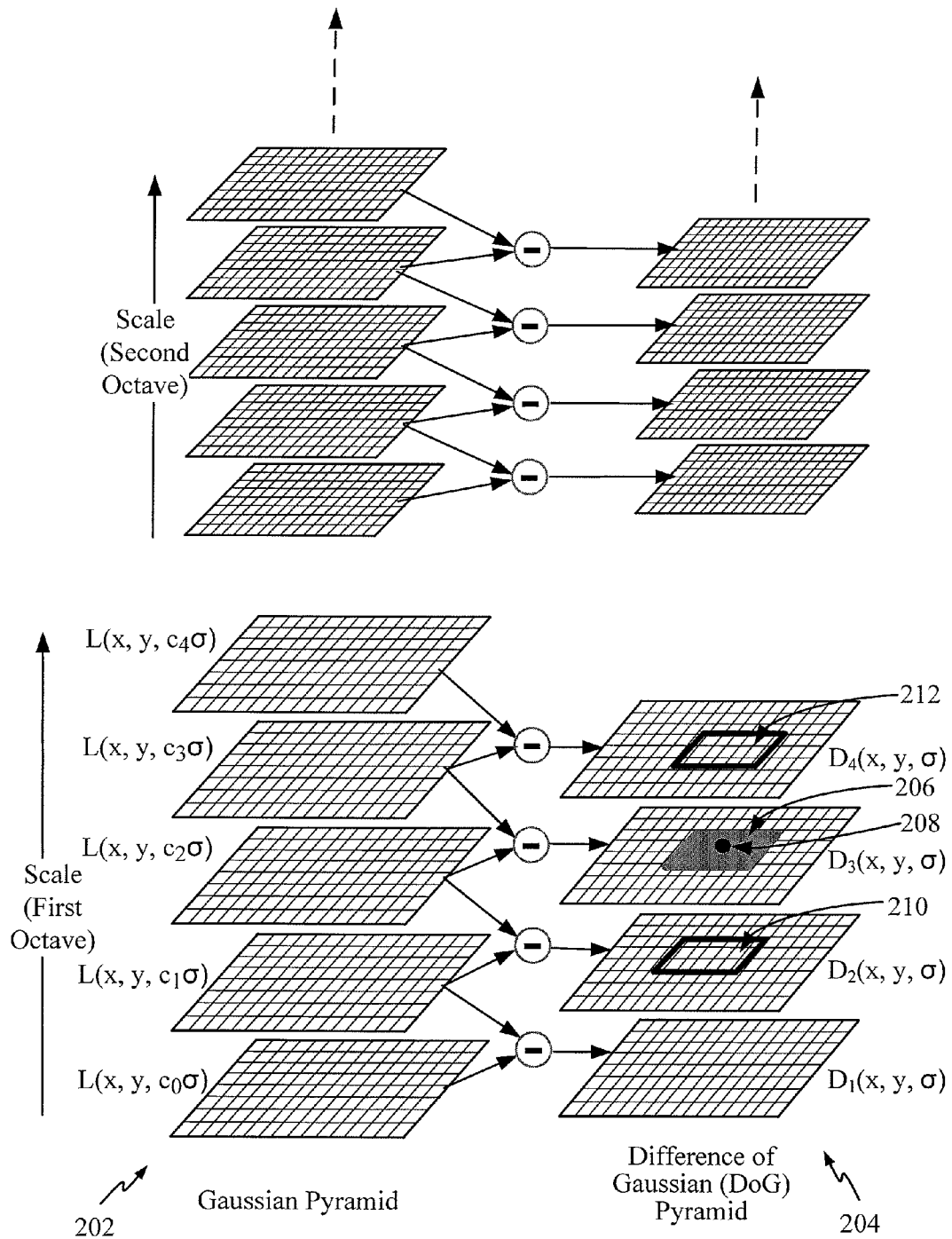
FIG. 4 is a diagram illustrating a process by which a feature extraction unit determines a difference of Gaussian (DoG) pyramid for use in performing keypoint extraction.

FIG. 4 is a diagram illustrating a difference of Gaussian (DoG) pyramid 204 that has been determined for use in feature descriptor extraction. Feature extraction unit 18 of FIG. 1 may construct DoG pyramid 204 by computing the difference of any two consecutive Gaussian-blurred images in Gaussian pyramid 202. The input image I(x, y), which is shown as image data 26 in the example of FIG. 1, is gradually Gaussian blurred to construct Gaussian pyramid 202. Gaussian blurring generally involves convolving the original image I(x, y) with the Gaussian blur function G(x, y, cσ) at scale cα such that the Gaussian blurred function L(x, y, cσ) is defined as L(x, y, cσ)=G(x, y, cσ)*I(x, y). Here, G is a Gaussian kernel, cα denotes the standard deviation of the Gaussian function that is used for blurring the image I(x, y). As c, is varied ($c_0 < c_1 < c_2 < c_3 < c_4$), the standard deviation cσ varies and a gradual blurring is obtained. Sigma σ is the base scale variable (essentially the width of the Gaussian kernel). When the initial image I(x, y) is incrementally convolved with Gaussians G to produce the blurred images L, the blurred images L are separated by the constant factor c in the scale space.

In DoG space or pyramid 204, D(x, y, a)=L(x, y, $c_n$σ)−L(x, y, $c_{n-1}$σ). A DoG image D(x, y, σ) is the difference between two adjacent Gaussian blurred images L at scales $c_n$σ and $c_{n-1}$σ. The scale of the D(x, y, σ) lies somewhere between $c_n$σ and $c_{n-1}$σ. As the number of Gaussian-blurred images L increase and the approximation provided for Gaussian pyramid 202 approaches a continuous space, the two scales also approach into one scale. The convolved images L may be grouped by octave, where an octave corresponds to a doubling of the value of the standard deviation σ. Moreover, the values of the multipliers k (e.g., $c_0 < c_1 < c_2 < c_3 < c_4$), are selected such that a fixed number of convolved images L are obtained per octave. Then, the DoG images D may be obtained from adjacent Gaussian-blurred images L per octave. After each octave, the Gaussian image is downsampled by a factor of 2 and then the process is repeated.

Feature extraction unit 18 may then use DoG pyramid 204 to identify keypoints for the image I(x, y). In performing keypoint detection, feature extraction unit 18 determines whether the local region or patch around a particular sample point or pixel in the image is a potentially interesting patch (geometrically speaking). Generally, feature extraction unit 18 identifies local maxima and/or local minima in the DoG space 204 and uses the locations of these maxima and minima as keypoint locations in DoG space 204. In the example illustrated in FIG. 4, feature extraction unit 18 identifies a keypoint 208 within a patch 206. Finding the local maxima and minima (also known as local extrema detection) may be achieved by comparing each pixel (e.g., the pixel for keypoint 208) in DoG space 204 to its eight neighboring pixels at the same scale and to the nine neighboring pixels (in adjacent patches 210 and 212) in each of the neighboring scales on the two sides, for a total of 26 pixels (9×2+8=26). If the pixel value for the keypoint 208 is a maximum or a minimum among all 26 compared pixels in the patches 206, 210, and 208, then feature extraction unit 18 selects this as a keypoint. Feature extraction unit 18 may further process the keypoints such that their location is identified more accurately. Feature extraction unit 18 may, in some instances, discard some of the keypoints, such as the low contrast key points and edge key points.

Figure 5:
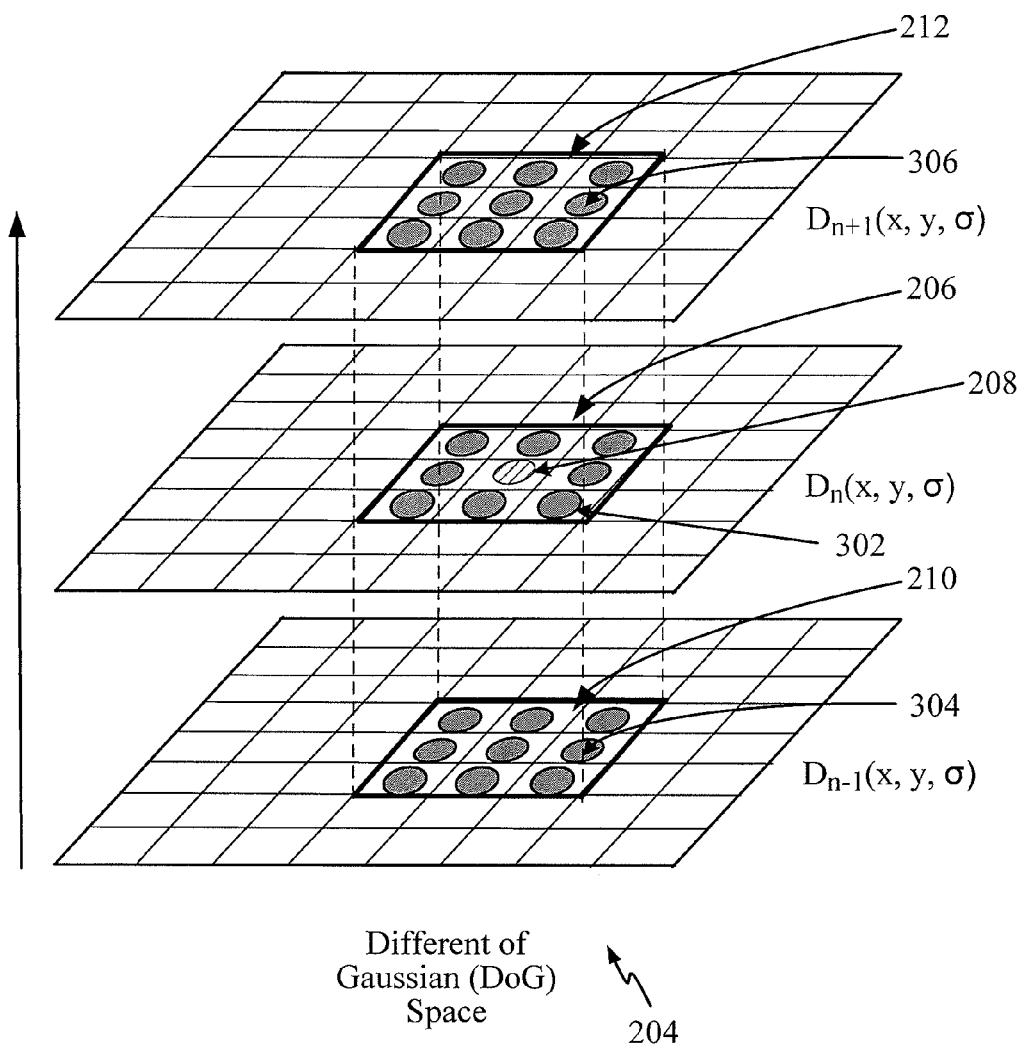
FIG. 5 is a diagram illustrating detection of a keypoint after determining a difference of Gaussian (DoG) pyramid.

FIG. 5 is a diagram illustrating detection of a keypoint in more detail. In the example of FIG. 5, each of the patches 206, 210, and 212 include a 3×3 pixel region. Feature extraction unit 18 first compares a pixel of interest (e.g., keypoint 208) to its eight neighboring pixels 302 at the same scale (e.g., patch 206) and to the nine neighboring pixels 304 and 306 in adjacent patches 210 and 212 in each of the neighboring scales on the two sides of the keypoint 208.

Feature extraction unit 18 may assign each keypoint one or more orientations, or directions, based on the directions of the local image gradient. By assigning a consistent orientation to each keypoint based on local image properties, feature extraction unit 18 may represent the keypoint descriptor relative to this orientation and therefore achieve invariance to image rotation. Feature extraction unit 18 then calculates magnitude and direction for every pixel in the neighboring region around the keypoint 208 in the Gaussian-blurred image L and/or at the keypoint scale. The magnitude of the gradient for the keypoint 208 located at (x, y) may be represented as m(x, y) and the orientation or direction of the gradient for the keypoint at (x, y) may be represented as Γ(x, y).

Feature extraction unit 18 then uses the scale of the keypoint to select the Gaussian smoothed image, L, with the closest scale to the scale of the keypoint 208, so that all computations are performed in a scale-invariant manner. For each image sample, L(x, y), at this scale, feature extraction unit 18 computes the gradient magnitude, m(x, y), and orientation, Γ(x, y), using pixel differences. For example the magnitude m(x,y) may be computed in accordance with the following equation (2):

$$m(x,y) = \sqrt{(L(x+1,y) - L(x-1,y))^2 + (L(x,y+1) - L(x,y-1))^2}. \quad (2)$$

Feature extraction unit 18 may calculate the direction or orientation Γ(x, y) in accordance with the following equation (3):

$$\Gamma(x, y) = \arctan\left[\frac{(L(x, y+1)L(x, y-1)}{(L(x+1, y) - L(x-1, y)}\right]. \quad (3)$$

In equation (3), L(x, y) represents a sample of the Gaussian-blurred image L(x, y, σ), at scale σ, which is also the scale of the keypoint.

Feature extraction unit 18 may consistently calculate the gradients for the keypoint either for the plane in the Gaussian pyramid that lies above, at a higher scale, than the plane of the keypoint in the DoG space or in a plane of the Gaussian pyramid that lies below, at a lower scale, than the keypoint. Either way, for each keypoint, feature extraction unit 18 calculates the gradients at the same scale in a rectangular area (e.g., patch) surrounding the keypoint. Moreover, the frequency of an image signal is reflected in the scale of the Gaussian-blurred image. Yet, SIFT and other algorithm, such as a compressed histogram of gradients (CHoG) algorithm, simply use gradient values at all pixels in the patch (e.g., rectangular area). A patch is defined around the keypoint; sub-blocks are defined within the block; samples are defined within the sub-blocks and this structure remains the same for all keypoints even when the scales of the keypoints are different. Therefore, while the frequency of an image signal changes with successive application of Gaussian smoothing filters in the same octave, the keypoints identified at different scales may be sampled with the same number of samples irrespective of the change in the frequency of the image signal, which is represented by the scale.

To characterize a keypoint orientation, feature extraction unit 18 may generate a gradient orientation histogram (see FIG. 6) by using, for example, SIFT. The contribution of each neighboring pixel may be weighted by the gradient magnitude and a Gaussian window. Peaks in the histogram correspond to dominant orientations. Feature extraction unit 18 may measure all the properties of the keypoint relative to the keypoint orientation, this provides invariance to rotation.

In one example, feature extraction unit 18 computes the distribution of the Gaussian-weighted gradients for each block, where each block is 2 sub-blocks by 2 sub-blocks for a total of 4 sub-blocks. To compute the distribution of the Gaussian-weighted gradients, feature extraction unit 18 forms an orientation histogram with several bins with each bin covering a part of the area around the keypoint. For example, the orientation histogram may have 36 bins, each bin covering 10 degrees of the 360 degree range of orientations. Alternatively, the histogram may have 8 bins, each covering 45 degrees of the 360 degree range. It should be clear that the histogram coding techniques described herein may be applicable to histograms of any number of bins.

Figure 6:
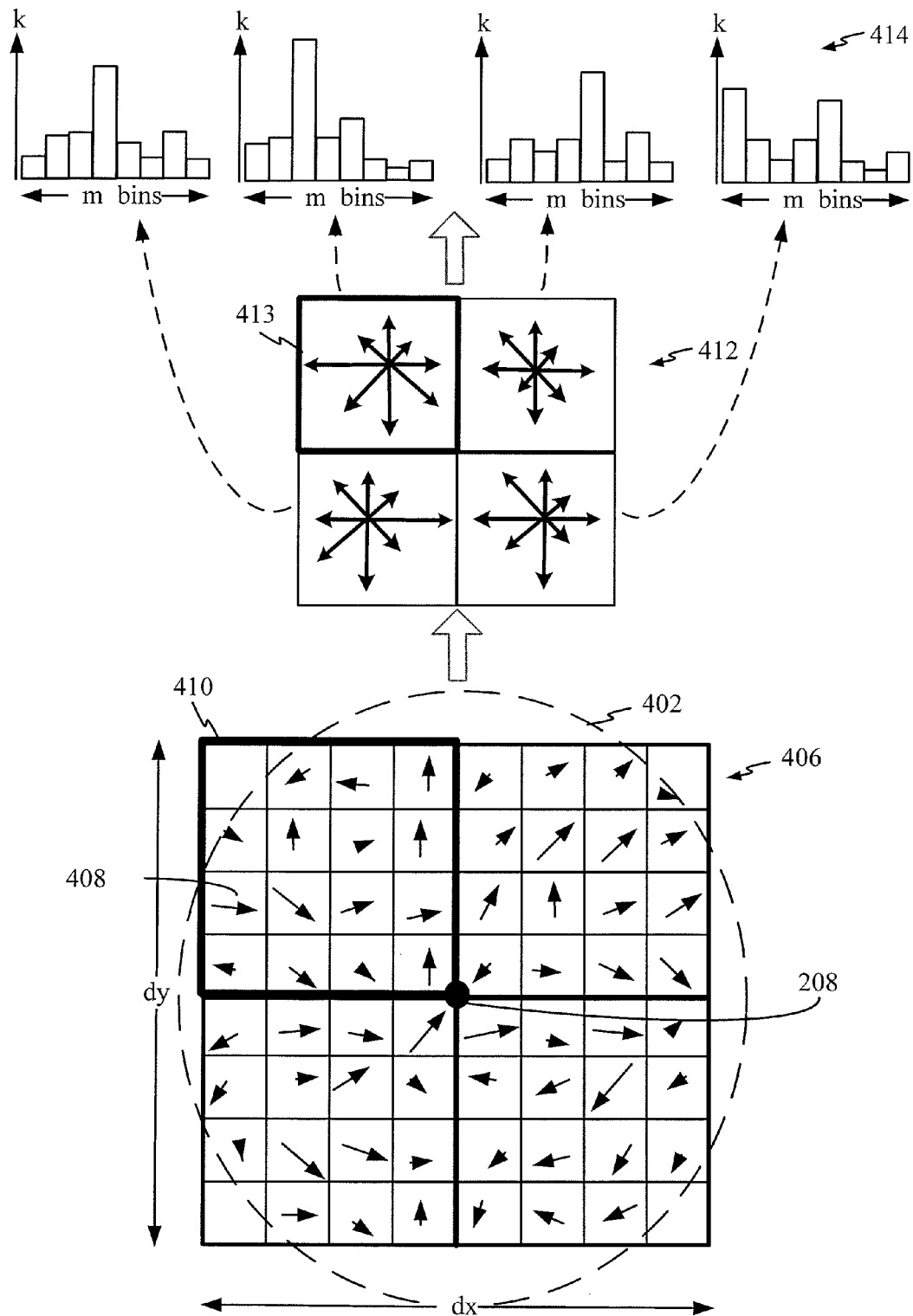
FIG. 6 is a diagram illustrating the process by which a feature extraction unit determines a gradient distribution and an orientation histogram.

FIG. 6 is a diagram illustrating the process by which a feature extraction unit, such as feature extraction unit 18, determines a gradient distribution and an orientation histogram. Here, a two-dimensional gradient distribution (dx, dy) (e.g., block 406) is converted to a one-dimensional distribution (e.g., histogram 414). The keypoint 208 is located at a center of the block 406 (also called a patch, cell or region) that surrounds the keypoint 208. The gradients that are pre-computed for each level of the pyramid are shown as small arrows at each sample location 408. As shown, regions of samples 408 form sub-blocks 410, which may also be referred to as bins 410. Feature extraction unit 18 may employ a Gaussian weighting function to assign a weight to each sample 408 within sub-blocks or bins 410. The weight assigned to each of the sample 408 by the Gaussian weighting function falls off smoothly from centroids of bins 410 and keypoint 208. The purpose of the Gaussian weighting function is to avoid sudden changes in the descriptor with small changes in position of the window and to give less emphasis to gradients that are far from the center of the descriptor. Feature extraction unit 18 determines an array of orientation histograms 412 with 8 orientations in each bin of the histogram resulting in a dimensional feature descriptor. For example, orientation histogram 413 may correspond to the gradient distribution for sub-block 410.

In some instances, feature extraction unit 18 may use other types of quantization bin constellations (e.g., with different Voronoi cell structures) to obtain gradient distributions. These other types of bin constellations may likewise employ a form of soft binning, where soft binning refers to overlapping bins, such as those defined when a so-called DAISY configuration is employed. In the example of FIG. 6, the three soft bins are defined, however, as many as 9 or more may be used with centroids generally positioned in a circular configuration 402 around keypoint 208.

As used herein, a histogram is a mapping $k_i$ that counts the number of observations, sample, or occurrences (e.g., gradients) that fall into various disjoint categories known as bins. The graph of a histogram is merely one way to represent a histogram. Thus, if k is the total number of observations, samples, or occurrences and m is the total number of bins, the frequencies in histogram $k_i$ satisfy the following condition expressed as equation (4):

$$n = \sum_{i=1}^{m} k_i, \quad (4)$$

where Σ is the summation operator.

Feature extraction unit 18 may weight each sample added to the histograms 412 by its gradient magnitude defined by the Gaussian-weighted function with a standard deviation that is 1.5 times the scale of the keypoint. Peaks in the resulting histogram 414 correspond to dominant directions of local gradients. Feature extraction unit 18 then detects the highest peak in the histogram and then any other local peak that is within a certain percentage, such as 80%, of the highest peak (which it may also use to also create a keypoint with that orientation). Therefore, for locations with multiple peaks of similar magnitude, feature extraction unit 18 extracts multiple keypoints created at the same location and scale but different orientations.

Feature extraction unit 18 then quantizes the histograms using a form of quantization referred to as type quantization, which expresses the histogram as a type. In this manner, feature extraction unit 18 may extract a descriptor for each keypoint, where such descriptor may be characterized by a location (x, y), an orientation, and a descriptor of the distributions of the Gaussian-weighted gradients in the form of a type. In this way, an image may be characterized by one or more keypoint descriptors (also referred to as image descriptors).

While the forgoing examples shown in FIGS. 4-6 provide one example of feature extraction performed by the SIFT algorithm, the techniques may be implemented with respect to feature descriptors extracted in accordance with any other visual search algorithm, such as a compressed histogram of gradient (CHoG) algorithm. The techniques should therefore not be limited in this respect to only feature descriptors extracted using the SIFT algorithm, but may be implemented with respect to feature descriptors extracted in accordance with any visual search algorithm.

Figure 7:
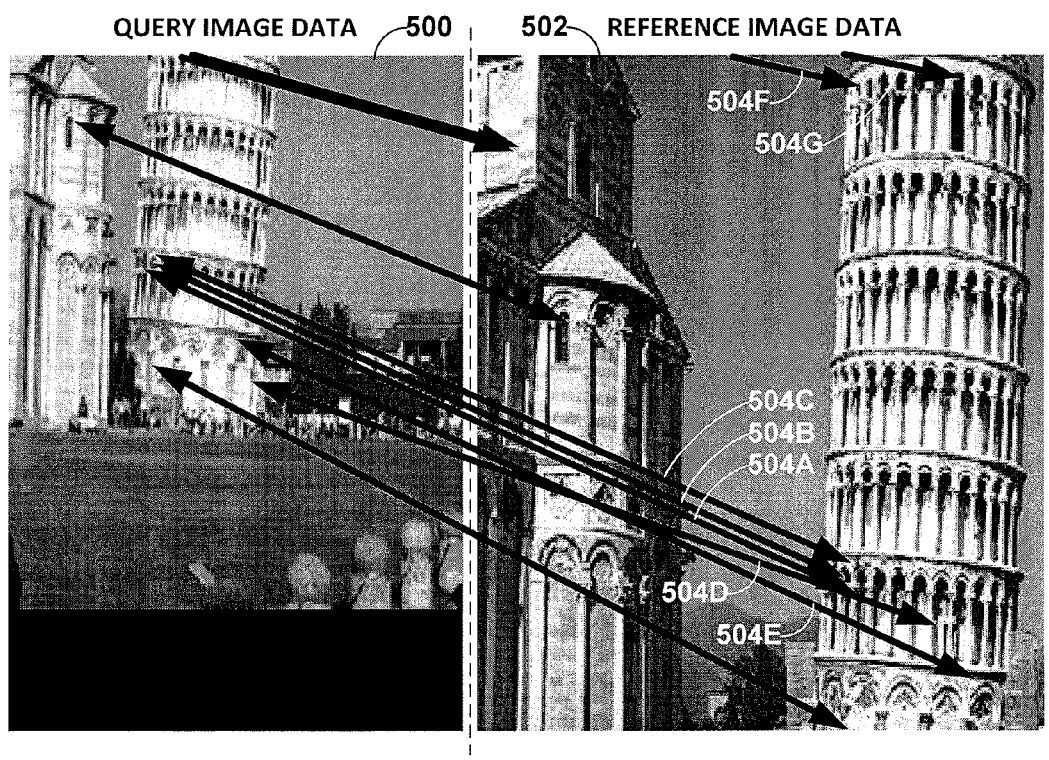
FIG. 7 is a diagram illustrating the process by which a feature extraction unit determines a gradient distribution and an orientation histogram.

FIG. 7 is a diagram illustrating example operation of a feature matching unit, such as feature matching unit 36 of FIG. 1, in performing feature matching in accordance with the techniques described in this disclosure. In the example of FIG. 7, query image data 500 and reference image data 502 is shown, where the query image data 500 is shown to the left of reference image data 502. The black lines show the relationship between query feature descriptors (which are represented by the left arrow head, where available) extracted from query image data 500 and reference feature descriptors (which are represented by the right arrow head) extracted from reference image data 502 and stored to feature descriptor database 38.

Query image data 500 shows an image of the Leaning Tower of Pisa capture or otherwise obtained by a client device, such as client device 12. Reference image data 502 shows another image of the Leaning Tower of Pisa stored to feature descriptor database 38. Query image data 500 and reference image data 502 show images of the Leaning Tower of Pisa captured as different scales and from different (although similar) perspectives. Feature matching unit 36 of visual search server 14 receives query feature descriptors 40 in this example that represent features denoted by the left arrows. Feature matching unit 36 determines matching reference feature descriptors 51 (referring to FIG. 2) that represent the corresponding features denoted by the right arrow.

In this example, the Leaning Tower of Pisa includes many repeating structures in the form of the repeating arches that surround the Leaning Tower of Pisa. Three black lines in particular denoted 504A-504C illustrate potential matches between corresponding query and reference feature descriptors that may be close to one another in the feature descriptor space. Rather than reject these matches as not being unique as would be common in conventional visual search algorithms, feature matching unit 36 may determine, for each of the corresponding query feature descriptors 40 represented by the left hand arrows of these lines 504A-504C, distances 62 (again, referring to FIG. 2) that are grouped in first group 66A with respect to one another.

For example, considering the match denoted by line 504A, feature matching unit 36 may determine that query feature descriptor 40 represented by the left arrow of line 504A matches reference feature descriptors 51 represented by right arrows for each of lines 504A-504C, as well as, 504D-504G. Feature matching unit 36 may determine distances 62 with respect to query feature descriptor 40 associated with line 504A with respect to reference feature descriptors 51 associated with lines 504A-504G in the manner described above. Next, feature matching unit 36 may group distances 62 computed with respect to query feature descriptor associated with line 504A and reference feature descriptors associated with lines 504A-504C, and another group that includes all of the remaining distances. Feature matching unit 36 may then average the first and second group distances 66, divide the first group average 68A by the second group average 68B and compare the result of the division to threshold 70. Feature matching unit 36 determines a unique match in this example and thereby determines the match shown as line 504A.

Conventional feature matching aspects of visual search algorithms, such as SIFT, may have rejected the match represented by line 504A by not employing a clustering algorithm. Rejecting this match may occur because the distance between query feature descriptor 40 extracted from the feature represented by the left arrow of line 504A and reference feature descriptor 51 extracted from the feature represented by the right arrow of line 504A would have been smallest. The next smallest distance, in this example, would have been the distance between query feature descriptor 40 extracted from the feature represented by the left arrow of line 504A and reference feature descriptor 51 extracted from the feature represented by the right arrow of line 504B. This next smallest distance may be nearly as small as the smallest distance noted above. Thus, when dividing the smallest distance by the next smallest distance in accordance with conventional feature matching aspects of visual search algorithms may result in a number near one, which may be greater than the threshold, which is typically set to some fraction of one, such as 0.5.

Thus, by employing a clustering algorithm to determine groups in accordance with the techniques described in this disclosure, feature matching unit 36 may group all of these relatively small distances 62 which reference repeating feature patterns into first group 66A, while all other distances 62 may be grouped in the second group, group 66B. Feature matching unit 36 then averages these distances so as to facilitate the comparison of each of these groups and compares this averages to avoid rejecting what would possibly be considered a unique match. As a result, the techniques may improve feature matching, especially with respect to images that have repeating features or aspects.

Moreover, to avoid rejection of potential matches while keeping control over accepting wrong matches, the robust distance ratio techniques of this disclosure provide the more discriminative similarity measure described above. The robust distance ratio techniques may be performed with little to no overhead computing cost by using the intermediate data stored while querying for a first nearest neighbor using k-dimensional tree (KD tree)-Best Bin First.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A method for performing a visual search with a visual search device, the method comprising:
    computing, with the visual search device, a distance between a query feature descriptor provided by way of a visual search query and each of a plurality of reference feature descriptors, wherein the visual search query initiates the visual search;
    determining, with the visual search device, a first group of one or more of the computed distances and a second group of the computed distances in accordance with a clustering algorithm, wherein the first group of the computed distances includes those of the computed distances that indicate the associated one of the plurality of reference feature descriptors are near to the query feature descriptor relative to the those of the computed distances determined to be in the second group of computed distances, and wherein the second group of the computed distances includes those of the computed distances that indicate the associated one of the plurality of reference feature descriptors are far from the query feature descriptor relative to the those of the computed distances determined to be in the first group of the one or more of the computed distances;
    determining, with the visual search device, whether the query feature descriptor matches one of the plurality of reference feature descriptors associated with a smallest one of the computed distances based on the determined first group of the computed distances and the second group of the computed distances;
    determining a unique group of reference images to include reference images associated with those of the plurality of reference feature descriptors from which the computed distances determined to be in the first group were computed to a corresponding group of reference feature descriptors such that the set of reference images does not include duplicate reference images;
    assigning a vote to each of the reference images determined to be in the unique group of reference images;
    ordering the reference images based on the assigned votes; and
    returning the ordered reference images in response to the visual search query.

2. The method of claim 1, wherein determining the first group of one or more of the computed distances and the second group of the computed distances includes determining the first group of the one or more of the computed distances and the second group of the computed distances in accordance with one or more of a k-means clustering algorithm, a Gaussian fitting algorithm and a graph cutting algorithm.

3. The method of claim 1, wherein determining whether the query feature descriptor matches one of the plurality of reference feature descriptors includes:
    computing an average of the two or more of the computed distances determined to be in the first group to generate a first group distance average;
    computing an average of the computed distances determined to be in the second group to generate a second group distance average;
    dividing the first group distance average by the second group distance average to generate an average distance ratio measure;
    comparing the average distance ratio measure to a threshold value; and
    determining whether the query feature descriptor matches the one of the plurality of reference feature descriptors associated with the smallest one of the computed distances based on the comparison.

4. The method of claim 1, wherein assigning a vote to each of the reference images determined to be in the unique group of reference images includes one or more of:
    assigning a constant vote to each of the reference images;
    assigning a vote proportional to a distance ratio of the corresponding computed distance compared to the computed distance between the query feature descriptor and a closest one of the plurality of reference feature descriptors; and
    assigning a vote proportional to a rank of the corresponding computed distance within the first group when the computed distances of the first group are ordered from smallest to largest.

5. The method of claim 1,
    wherein the query feature descriptor comprises one of a plurality of query feature descriptors extracted from query image data in accordance with a visual search algorithm and provided by way of the visual search query, and
    wherein the method further comprises:
    for each of the plurality of query feature descriptors, computing a distance between a current one of the plurality of query feature descriptors and each of the plurality of reference feature descriptors to generate a computed plurality of distances;
    for each of the plurality of distances, determining the first group of the computed plurality of distances and the second group of the computed plurality of distances in accordance with the clustering algorithm, wherein the first group of the computed plurality of distances includes those of the computed distances that indicate the associated one of the plurality of reference feature descriptors are near to the query feature descriptor relative to the those of the computed plurality of distances determined to be in the second group of the computed plurality of distances, and wherein the second group of the computed plurality of distances includes those of the computed plurality of distances that indicate the associated one of the plurality of reference feature descriptors are far from the current one of the plurality of query feature descriptors relative to the those of the computed plurality of distances determined to be in the first group of computed plurality of distances; and determining, with the visual search device, whether each of the plurality of query feature descriptor matches one of the plurality of reference feature descriptors associated with a smallest one of the computed plurality of distances based on the determined first group of the computed plurality of distances and the second group of the computed plurality of distances.

6. The method of claim 5, further comprising:

determining, for each of the plurality of query feature descriptors, a unique group of reference images to include reference images associated with those of the plurality of reference feature descriptors from which the computed plurality of distances determined to be in the first group were computed to a corresponding group of reference feature descriptors such that the set of reference images does not include duplicate reference images;

assigning a vote to each of the reference images determined to be in the unique group of reference images determined for each of the plurality of query feature descriptors;

after assigning the votes with respect to each of the plurality of query feature descriptors, ordering the reference images based on the assigned votes; and returning the ordered reference images in response to the visual search query.

7. The method of claim 1, wherein the query feature descriptor is extracted from a query image in accordance with a local feature-based visual search algorithm.

8. The method of claim 7, wherein the local feature-based visual search algorithm comprises a scale invariant feature transform (SIFT) algorithm.

9. The method of claim 1, further comprising:

receiving the query feature descriptor as a compressed query feature descriptor via an interface of the visual search device from a client device; and reconstructing the query feature descriptor from the compressed query feature descriptor with the visual search device.

10. An apparatus for performing a visual search, the apparatus comprising:

means for computing a distance between a query feature descriptor provided by way of a visual search query and each of a plurality of reference feature descriptors, wherein the visual search query initiates the visual search;

means for determining a first group of one or more of the computed distances and a second group of the computed distances in accordance with a clustering algorithm, wherein the first group of the computed distances includes those of the computed distances that indicate the associated one of the plurality of reference feature descriptors are near to the query feature descriptor relative to the those of the computed distances determined to be in the second group of computed distances, and wherein the second group of the computed distances includes those of the computed distances that indicate the associated one of the plurality of reference feature descriptors are far from the query feature descriptor relative to the those of the computed distances determined to be in the first group of the one or more of the computed distances;

means for determining whether the query feature descriptor matches one of the plurality of reference feature descriptors associated with a smallest one of the computed distances based on the determined first group of the computed distances and the second group of the computed distances;

means for determining a unique group of reference images to include reference images associated with those of the plurality of reference feature descriptors from which the computed distances determined to be in the first group were computed to a corresponding group of reference feature descriptors such that the set of reference images does not include duplicate reference images;

means for assigning a vote to each of the reference images determined to be in the unique group of reference images;

means for ordering the reference images based on the assigned votes; and means for returning the ordered reference images in response to the visual search query.

11. The apparatus of claim 10, further comprising means for determining the first group of the one or more of the computed distances and the second group of the computed distances in accordance with one or more of a k-means clustering algorithm, a Gaussian fitting algorithm and a graph cutting algorithm.

12. The apparatus of claim 10, further comprising:

means for computing an average of the two or more of the computed distances determined to be in the first group to generate a first group distance average;

means for computing an average of the computed distances determined to be in the second group to generate a second group distance average;

means for dividing the first group distance average by the second group distance average to generate an average distance ratio measure;

means for comparing the average distance ratio measure to a threshold value; and means for determining whether the query feature descriptor matches the one of the plurality of reference feature descriptors associated with the smallest one of the computed distances based on the comparison.

13. The apparatus of claim 10, further comprising one or more of:

means for assigning a constant vote to each of the reference images;

means for assigning a vote proportional to a distance ratio of the corresponding computed distance compared to the computed distance between the query feature descriptor and a closest one of the plurality of reference feature descriptors; and means for assigning a vote proportional to a rank of the corresponding computed distance within the first group when the computed distances of the first group are ordered from smallest to largest.

14. The apparatus of claim 10, wherein the query feature descriptor comprises one of a plurality of query feature descriptors extracted from query image data in accordance with a visual search algorithm and provided by way of the visual search query, and wherein the apparatus further comprises:

means for computing, for each of the plurality of distances, a distance between a current one of the plurality of query feature descriptors and each of the plurality of reference feature descriptors to generate a computed plurality of distances;

means for determining, for each of the plurality of distances, the first group of the computed plurality of distances and the second group of the computed plurality of distances in accordance with the clustering algorithm, wherein the first group of the computed plurality of distances includes those of the computed distances that indicate the associated one of the plurality of reference feature descriptors are near to the query feature descriptor relative to the those of the computed plurality of distances determined to be in the second group of the computed plurality of distances, and wherein the second group of the computed plurality of distances includes those of the computed plurality of distances that indicate the associated one of the plurality of reference feature descriptors are far from the current one of the plurality of query feature descriptors relative to the those of the computed plurality of distances determined to be in the first group of computed plurality of distances; and means for determining whether each of the plurality of query feature descriptor matches one of the plurality of reference feature descriptors associated with a smallest one of the computed plurality of distances based on the determined first group of the computed plurality of distances and the second group of the computed plurality of distances.

15. The apparatus of claim 14, further comprising:

means for determining, for each of the plurality of query feature descriptors, a unique group of reference images to include reference images associated with those of the plurality of reference feature descriptors from which the computed plurality of distances determined to be in the first group were computed to a corresponding group of reference feature descriptors such that the set of reference images does not include duplicate reference images;

means for assigning a vote to each of the reference images determined to be in the unique group of reference images determined for each of the plurality of query feature descriptors;

after assigning the votes with respect to each of the plurality of query feature descriptors, means for ordering the reference images based on the assigned votes; and means for returning the ordered reference images in response to the visual search query.

16. The apparatus of claim 10, wherein the query feature descriptor is extracted from a query image in accordance with a local feature-based visual search algorithm.

17. The apparatus of claim 16, wherein the local feature-based visual search algorithm comprises a scale invariant feature transform (SIFT) algorithm.

18. The apparatus of claim 10, further comprising:

means for receiving the query feature descriptor as a compressed query feature descriptor via an interface of a visual search device from a client device; and means for reconstructing the query feature descriptor from the compressed query feature descriptor with the visual search device.

19. An apparatus configured to perform a visual search, the apparatus comprising:

an interface configured to receive a query feature descriptor;

a feature matching unit configured to:

compute a distance between the query feature descriptor provided by way of a visual search query and each of a plurality of reference feature descriptors, wherein the visual search query initiates the visual search, and configured to determine a first group of one or more of the computed distances and a second group of the computed distances in accordance with a clustering algorithm, wherein the first group of the computed distances includes those of the computed distances that indicate the associated one of the plurality of reference feature descriptors are near to the query feature descriptor relative to the those of the computed distances determined to be in the second group of computed distances, and wherein the second group of the computed distances includes those of the computed distances that indicate the associated one of the plurality of reference feature descriptors are far from the query feature descriptor relative to the those of the computed distances determined to be in the first group of the one or more of the computed distances and wherein the feature matching unit is further configured to determine whether the query feature descriptor matches one of the plurality of reference feature descriptors associated with a smallest one of the computed distances based on the determined first group of the computed distances and the second group of the computed distances;

determine a unique group of reference images to include reference images associated with those of the plurality of reference feature descriptors from which the computed distances determined to be in the first group were computed to a corresponding group of reference feature descriptors such that the set of reference images does not include duplicate reference images;

assign a vote to each of the reference images determined to be in the unique group of reference images;

order the reference images based on the assigned votes; and return the ordered reference images in response to the visual search query.

20. The apparatus of claim 19, wherein the feature matching unit is configured to determine the first group of the one or more of the computed distances and the second group of the computed distances in accordance with one or more of a k-means clustering algorithm, a Gaussian fitting algorithm and a graph cutting algorithm.

21. The apparatus of claim 19, wherein the feature matching unit is further configured to compute an average of the two or more of the computed distances determined to be in the first group to generate a first group distance average, to compute an average of the computed distances determined to be in the second group to generate a second group distance average, to divide the first group distance average by the second group distance average to generate an average distance ratio measure, and to compare the average distance ratio measure to a threshold value and determine whether the query feature descriptor matches the one of the plurality of reference feature descriptors associated with the smallest one of the computed distances based on the comparison.

22. The apparatus of claim 19, wherein the feature matching unit is configured to assign the vote by one or more of assigning a constant vote to each of the reference images, assigning a vote proportional to a distance ratio of the corresponding computed distance compared to the computed distance between the query feature descriptor and a closest one of the plurality of reference feature descriptors and assigning a vote proportional to a rank of the corresponding computed distance within the first group when the computed distances of the first group are ordered from smallest to largest.

23. The apparatus of claim 19,
wherein the query feature descriptor comprises one of a plurality of query feature descriptors extracted from query image data in accordance with a visual search algorithm and provided by way of the visual search query, and
wherein the feature matching unit is further configured to:
for each of the plurality of query feature descriptors, compute a distance between a current one of the plurality of query feature descriptors and each of the plurality of reference feature descriptors to generate a computed plurality of distances;
for each of the plurality of distances, determine the first group of the computed plurality of distances and the second group of the computed plurality of distances in accordance with the clustering algorithm, wherein the first group of the computed plurality of distances includes those of the computed distances that indicate the associated one of the plurality of reference feature descriptors are near to the query feature descriptor relative to the those of the computed plurality of distances determined to be in the second group of the computed plurality of distances, and wherein the second group of the computed plurality of distances includes those of the computed plurality of distances that indicate the associated one of the plurality of reference feature descriptors are far from the current one of the plurality of query feature descriptors relative to the those of the computed plurality of distances determined to be in the first group of computed plurality of distances; and
determine whether each of the plurality of query feature descriptor matches one of the plurality of reference feature descriptors associated with a smallest one of the computed plurality of distances based on the determined first group of the computed plurality of distances and the second group of the computed plurality of distances.

24. The apparatus of claim 23, wherein the feature matching unit is further configured to:
determines, for each of the plurality of query feature descriptors, a unique group of reference images to include reference images associated with those of the plurality of reference feature descriptors from which the computed plurality of distances determined to be in the first group were computed to a corresponding group of reference feature descriptors such that the set of reference images does not include duplicate reference images;
assign a vote to each of the reference images determined to be in the unique group of reference images determined for each of the plurality of query feature descriptors, after assigning the votes with respect to each of the plurality of query feature descriptors, orders the reference images based on the assigned votes; and
wherein the interface returns the ordered reference images in response to the visual search query.

25. The apparatus of claim 19, wherein the query feature descriptor is extracted from a query image in accordance with a local feature-based visual search algorithm.

26. The apparatus of claim 25, wherein the local feature-based visual search algorithm comprises a scale invariant feature transform (SIFT) algorithm.

27. The apparatus of claim 19,
wherein the interface is configured to receive the query feature descriptor as a compressed query feature descriptor from a client device, and
wherein the apparatus includes a feature reconstruction unit that is configured to reconstruct the query feature descriptor from the compressed query feature descriptor with a visual search device.

28. A non-transitory computer-readable medium comprising instruction that, when executed, cause one or more processors to:
compute a distance between a query feature descriptor provided by way of a visual search query and each of a plurality of reference feature descriptors, wherein the visual search query initiates a visual search;
determine a first group of one or more of the computed distances and a second group of the computed distances in accordance with a clustering algorithm, wherein the first group of the computed distances includes those of the computed distances that indicate the associated one of the plurality of reference feature descriptors are near to the query feature descriptor relative to the those of the computed distances determined to be in the second group of computed distances, and wherein the second group of the computed distances includes those of the computed distances that indicate the associated one of the plurality of reference feature descriptors are far from the query feature descriptor relative to the those of the computed distances determined to be in the first group of the one or more of the computed distances;
determine whether the query feature descriptor matches one of the plurality of reference feature descriptors associated with a smallest one of the computed distances based on the determined first group of the computed distances and the second group of the computed distances;
determine a unique group of reference images to include reference images associated with those of the plurality of reference feature descriptors from which the computed distances determined to be in the first group were computed to a corresponding group of reference feature descriptors such that the set of reference images does not include duplicate reference images;
assign a vote to each of the reference images determined to be in the unique group of reference images;
order the reference images based on the assigned votes; and
return the ordered reference images in response to the visual search query.

29. The non-transitory computer-readable medium of claim 28, further comprising instructions that cause, when executed, the one or more processors to determine the first group of the one or more of the computed distances and the second group of the computed distances in accordance with one or more of a k-means clustering algorithm, a Gaussian fitting algorithm and a graph cutting algorithm.

30. The non-transitory computer-readable medium of claim 28, further comprising instructions that cause, when executed, the one or more processors to:
compute an average of the two or more of the computed distances determined to be in the first group to generate a first group distance average;
compute an average of the computed distances determined to be in the second group to generate a second group distance average;
divide the first group distance average by the second group distance average to generate an average distance ratio measure;

compare the average distance ratio measure to a threshold value; and determine whether the query feature descriptor matches the one of the plurality of reference feature descriptors associated with the smallest one of the computed distances based on the comparison.

31. The non-transitory computer-readable medium of claim 28, further comprising instructions that cause, when executed, the one or more processors to:

assign a constant vote to each of the reference images;

assign a vote proportional to a distance ratio of the corresponding computed distance compared to the computed distance between the query feature descriptor and a closest one of the plurality of reference feature descriptors; and assign a vote proportional to a rank of the corresponding computed distance within the first group when the computed distances of the first group are ordered from smallest to largest.

32. The non-transitory computer-readable medium of claim 28, wherein the query feature descriptor comprises one of a plurality of query feature descriptors extracted from query image data in accordance with a visual search algorithm and provided by way of the visual search query, wherein the computer-readable medium further comprises instructions that cause, when executed, the one or more processors to:

for each of the plurality of query feature descriptors, compute a distance between a current one of the plurality of query feature descriptors and each of the plurality of reference feature descriptors to generate a computed plurality of distances;

for each of the plurality of distances, determine the first group of the computed plurality of distances and the second group of the computed plurality of distances in accordance with the clustering algorithm, wherein the first group of the computed plurality of distances includes those of the computed distances that indicate the associated one of the plurality of reference feature descriptors are near to the query feature descriptor relative to the those of the computed plurality of distances determined to be in the second group of the computed plurality of distances, and wherein the second group of the computed plurality of distances includes those of the computed plurality of distances that indicate the associated one of the plurality of reference feature descriptors are far from the current one of the plurality of query feature descriptors relative to the those of the computed plurality of distances determined to be in the first group of computed plurality of distances; and determine whether each of the plurality of query feature descriptor matches one of the plurality of reference feature descriptors associated with a smallest one of the computed plurality of distances based on the determined first group of the computed plurality of distances and the second group of the computed plurality of distances.

33. The non-transitory computer-readable medium of claim 32, further comprising instructions that cause, when executed, the one or more processors to:

determine, for each of the plurality of query feature descriptors, a unique group of reference images to include reference images associated with those of the plurality of reference feature descriptors from which the computed plurality of distances determined to be in the first group were computed to a corresponding group of reference feature descriptors such that the set of reference images does not include duplicate reference images;

assign a vote to each of the reference images determined to be in the unique group of reference images determined for each of the plurality of query feature descriptors;

after assigning the votes with respect to each of the plurality of query feature descriptors, order the reference images based on the assigned votes; and return the ordered reference images in response to the visual search query.

34. The non-transitory computer-readable medium of claim 28, wherein the query feature descriptor is extracted from a query image in accordance with a local feature-based visual search algorithm.

35. The non-transitory computer-readable medium of claim 34, wherein the local feature-based visual search algorithm comprises a scale invariant feature transform (SIFT) algorithm.

36. The non-transitory computer-readable medium of claim 28, further comprising instructions that cause, when executed, the one or more processors to:

receive the query feature descriptor as a compressed query feature descriptor via an interface of a visual search device from a client device; and reconstruct the query feature descriptor from the compressed query feature descriptor with the visual search device.

37. A system comprising:

an input to receive information received from one or more client devices, wherein the information comprises a query feature descriptor to initiate a visual search;

a database including information indicative of a plurality of reference query descriptors; and a visual search server device configured to perform the visual search, the visual search server device comprising:

an interface to receive the query feature descriptor; and a feature matching unit configured to:

compute a distance between the query feature descriptor and each of the plurality of reference query descriptors;

determine a first group of one or more of the computed distances and a second group of the computed distances in accordance with a clustering algorithm, wherein the first group of the computed distances includes those of the computed distances that indicate the associated one of the plurality of reference query descriptors are near to the query feature descriptor relative to the those of the computed distances determined to be in the second group of computed distances, and wherein the second group of the computed distances includes those of the computed distances that indicate the associated one of the plurality of reference query descriptors are far from the query feature descriptor relative to the those of the computed distances determined to be in the first group of the one or more of the computed distances;

determine whether the query feature descriptor matches one of the plurality of reference query descriptors associated with a smallest one of the computed distances based on the determined first group of the computed distances and the second group of the computed distances;

determine a unique group of reference images to include reference images associated with those of the plurality of reference feature descriptors from which the computed distances determined to be in the first group were computed to a corresponding group of reference feature descriptors such that the set of reference images does not include duplicate reference images;
assign a vote to each of the reference images determined to be in the unique group of reference images;
order the reference images based on the assigned votes; and
return the ordered reference images in response to the visual search query.

* * * * *